United States Patent [19]
Cunningham et al.

[11] Patent Number: 5,920,441
[45] Date of Patent: Jul. 6, 1999

[54] METHOD AND APPARATUS FOR CONTROLLING A MULTIPLE-STAGE ACTUATOR FOR A DISK DRIVE

[75] Inventors: Earl Albert Cunningham, Rochester, Minn.; Long-Sheng Fan, San Jose, Calif.; Hal Hjalmar Ottesen, Rochester, Minn.; Timothy Clark Reiley, Los Gatos, Calif.

[73] Assignee: International Business Machines Corporation, Armonk, N.Y.

[21] Appl. No.: 08/532,340

[22] Filed: Sep. 22, 1995

[51] Int. Cl.$^6$ .................................................. G11B 5/596
[52] U.S. Cl. .................................. 360/78.05; 360/78.03; 360/78.05
[58] Field of Search ........................... 360/78.05, 77.02, 360/75, 78.04, 78.07, 78.09, 78.12, 105, 109, 78.03

[56] References Cited

U.S. PATENT DOCUMENTS

| | | | |
|---|---|---|---|
| 3,924,268 | 12/1975 | McIntosh et al. | 360/78 |
| 4,866,687 | 9/1989 | Kasai et al. | 360/78.05 X |
| 4,914,725 | 4/1990 | Belser et al. | 318/560 |
| 5,038,333 | 8/1991 | Chow et al. | 360/78.07 X |
| 5,060,210 | 10/1991 | Fennema et al. | 369/32 |
| 5,063,454 | 11/1991 | Hashimoto | 360/78.02 |
| 5,189,578 | 2/1993 | Mori et al. | 360/78.05 X |
| 5,303,105 | 4/1994 | Jorgenson | 360/106 |
| 5,325,245 | 6/1994 | Shinizu et al. | 360/75 X |
| 5,406,535 | 4/1995 | Seo et al. | 360/78.07 X |
| 5,477,402 | 12/1995 | Elliott et al. | 360/77.08 |
| 5,510,939 | 4/1996 | Lewis | 360/78.04 X |
| 5,521,778 | 5/1996 | Boutaghou et al. | 360/106 |
| 5,521,891 | 5/1996 | Nakane | 360/78.04 X |

OTHER PUBLICATIONS

L. Fan, IBM TDB, vol. 37, No. 08, Aug. 1994, pp. 401–403.

R.W. Lissner et al., "Disk File Actuator", IBM Technical Disclosure Bulletin, vol. 17, No. 10, Mar. 1975, pp. 3016–3018.

L–S. Fan et al., "Shock–Resistant Rotary Microactuator for Fine Positioning of Recording Heads", IBM Technical Disclosure Bulletin, vol. 37, No. 08, Aug. 1994, pp. 401–403.

L–S. Fan et al., "Batch–Fabricated Area–Efficient Milli–Actuators", Technical Digest of IEEE Solid–State and Actuator Workshop, Helton Head, S.C., Jun. 1994, pp. 38–42.

L–S. Fan et al., "Batch–Fabricated Milli–Actuators", Proceedings of IEEE Micro Electro Mechanical systems, Feb. 1993, pp. 179–183.

*Primary Examiner*—Aristotelis M. Psitos
*Assistant Examiner*—Kin Wong
*Attorney, Agent, or Firm*—Matthew J. Bussan

[57] ABSTRACT

A method and apparatus for controlling a multiple-stage actuator for a disk drive which does not require an additional sensor for measuring the relative position between adjacent actuator stages. In a two-stage actuator system, a position-type secondary actuator (SA) rides piggyback on a primary actuator (PA). The repeatable runout is measured and used as a feedforward signal to the PA. If the PA is a rotary actuator, the feedforward signal is preferably arc corrected for the arc that the head transverses from the inner radius to the outer radius of the disk. Added to the feedforward signal is the moving average of the drive signal applied to the SA. Because the SA is of the position-type having a neutral position, this moving average is proportional to the time cumulative drift present in the two-stage actuator system, and forces the PA in a direction that minimizes deviation of the SA from its neutral position. This minimizes the range requirement for the SA, the main purpose of which is to reduce non-repeatable runout.

5 Claims, 11 Drawing Sheets

METHOD AND APPARATUS FOR CONTROLLING A MULTIPLE-STAGE ACTUATOR FOR A DISK DRIVE

FIELD OF THE INVENTION

The present invention relates to actuators for disk drives and, more particularly, to a method and apparatus for controlling a multiple-stage actuator for a disk drive.

BACKGROUND OF THE INVENTION

Computers often include disk drives, such as magnetic and optical disk drives, on which data can be written and from which data can be read for later use. A primary trend in disk drives is that the areal size of a bit which may be reliably written and read continues to decrease at a rate of more than 50 percent per year. Consequently, the width of a track containing a sequence of such bits must diminish at roughly half this rate. Assuming this situation continues, an advanced magnetic disk drive, which currently has a track density of 4000 to 5000 tracks per inch (tpi), is likely to have 20 to 25 ktpi by the year 2000. As disk drives are reduced in size and their recording density is increased, the head (transducer, objective lens or mirror) positioning resolution provided by traditional single-stage actuators either has reached or is rapidly approaching a track density limit. The geometry and form factor of disk drives limit the relative lever arm length of single-stage actuators, as well as reduce the size, power and efficiency of the voice coil motor, and further track density increases are thereby limited unless alternative approaches are implemented.

The typical single-stage actuator for a disk drive includes an armature arm attached to an actuator arm, with a pivot therebetween. A head is mounted on a load beam attached to the actuator arm. The armature arm is driven, typically by a voice coil motor, about the pivot to move the head relative to the disk media. The actuator must be confined within the disk drive and be movable with respect to the disk media similarly located within the disk drive. Any increase in the length of the armature arm which might serve to increase the resolution of the positioning of the actuator arm is severely limited by the overall size limitations placed on the disk drive. Similarly, the travel of the armature arm is limited by the structure of the disk drive.

The disk media used in optical and magnetic disk drives already permit high recording density. With disk media having very fine resolution recording capability, the actuator and the actuator positioning resolution, more particularly, becomes the recording limiting factor.

Typically, optical disk drives, such as compact disk (CD) players and compact disk read-only memory (CD-ROM) drives, have a two-stage actuator that provides very fine positioning resolution. These two-stage actuators have a secondary actuator (SA) that rides piggyback on a primary actuator (PA). Such multiple-stage actuators decouple the actuator inertia and stiction to increase the electromechanical zero bandwidth. The PA handles course low bandwidth (low frequency) movements, and the SA handles fine high bandwidth (high frequency) movements to keep the track misregistration (TMR) to a minimum. These two-stage actuators require a sensor, in addition to the head, that measures the relative position between the PA and the SA. As disclosed in U.S. Pat. No. 5,060,210 issued Oct. 22, 1991 to Fennema et al., the relative position sensed by an additional sensor is supplied to the PA for causing the PA to follow the motions of the SA.

The use of such an additional sensor has many disadvantages, including cost and mass, and the need for signal cabling thereto. These disadvantages become more prominent as the number of head/disk interfaces and hence secondary actuators in the disk drive increases. For example, a drive with four disks having a total of eight disk surfaces and eight heads would require eight sensors, each sensing the relative position between a PA and one of eight secondary actuators riding piggyback on the PA. Moreover, noise from each sensor can adversely influence the read performance of the head.

Furthermore, the range of applications for which disk drives are being used has changed from one in which stable, relatively massive units are protected from substantial operating shock and vibration. Disk drives are now being used in portable or other light-weight applications, such as laptop or notebook computers, which allow the drive to be exposed to greater shock and vibration, in any orientation. The offset between the actual head position and the track center is called the track misregistration (TMR). As the track pitch decreases, the allowable level of TMR drops and any increased level of shock and vibration becomes even more troublesome.

OBJECTS OF THE INVENTION

It is an object of the present invention to increase the track recording density of a disk drive.

It is another object of the present invention to improve actuator positioning resolution of an actuator of a disk drive.

It is another object of the present invention to eliminate the need for an additional sensor to measure the relative position between adjacent actuator stages, e.g., between a primary actuator (PA) and a secondary actuator (SA), in a disk drive having a multiple-stage actuator.

It is another object of the present invention to provide a disk drive actuator which follows non-repeatable bearing runout.

It is another object of the present invention to increase the electromechanical servo bandwidth of an actuator of a disk drive.

It is another object of the present invention to decrease the effect of stiction on an actuator of a disk drive. Stiction may be caused by, for example, the non-linear, hysteretic behavior exhibited by actuator bearings.

It is another object of the present invention to reduce the susceptibility of a disk drive to shock and vibration.

The shortcomings of the prior art are overcome and the objects of the present invention are accomplished by the present invention, a summary of which follows.

SUMMARY OF THE INVENTION

A first aspect of the present invention is directed to an apparatus for controlling a multiple-stage actuator for a disk drive. Multiple-stage actuators are used to improve (increase) electromechanical servo bandwidth by decoupling actuator inertia and stiction. The multiple-stage actuator includes a secondary actuator (SA) riding piggyback on a primary actuator (PA). The apparatus for controlling the multiple-stage actuator comprises means for generating a drive signal for the SA, means for calculating a moving average of the SA drive signal, means for generating a feedforward compensation signal, and means for generating a modified feedforward compensation signal for the PA by modifying the feedforward compensation signal based on the moving average of the SA drive signal. The moving average of the SA drive signal is proportional to the mechanical physical offset of the SA from its neutral position.

Preferably, the means for calculating the moving average of the SA drive signal includes means for measuring the SA drive signal during a predetermined portion of disk rotation. Also preferably, the means for generating a modified feedforward compensation signal includes an adder for adding the feedforward compensation signal and the moving average of the SA drive signal. Also preferably, the PA is a rotary actuator, and the means for generating a feedforward compensation signal includes means for arc correcting the feedforward compensation signal.

The multiple-stage actuator may further include a tertiary actuator (TA) riding piggyback on the SA. In this case, it is preferred that the apparatus for controlling a multiple-stage actuator further comprises means for generating a drive signal for the TA, means for calculating a moving average of the TA drive signal, and means for modifying the SA drive signal based on the moving average of the TA drive signal.

A second aspect of the present invention is directed to a method for controlling a multiple-stage actuator for a disk drive. The multiple-stage actuator includes a secondary actuator (SA) riding piggyback on a primary actuator (PA). The method for controlling the multiple-stage actuator comprises the steps of generating a drive signal for the SA, calculating a moving average of the SA drive signal, generating a feedforward compensation signal, and generating a modified feedforward compensation signal for the PA by modifying the feedforward compensation signal based on the moving average of the SA drive signal.

Preferably, the step of calculating the moving average of the SA drive signal includes a substep of measuring the SA drive signal during a predetermined portion of disk rotation. Also, preferably, the step of generating a modified feedforward compensation signal includes a substep of adding the feedforward compensation signal and the moving average of the SA drive signal.

The multiple-stage actuator may also include a tertiary actuator (TA) riding piggyback on the SA. In this case, it is preferred that the method for controlling the multiple-stage actuator further comprises the steps of generating a drive signal for the TA, calculating a moving average of the TA drive signal, and modifying the SA drive signal based on the moving average of the TA drive signal.

A third aspect of the present invention is directed to a multiple-stage actuator for a disk drive. The multiple-stage actuator comprises a primary actuator (PA), a secondary actuator (SA) riding piggyback on the PA, and control means for controlling the PA and the SA. The control means includes means for generating a drive signal for the SA, means for calculating a moving average of the SA drive signal, means for generating a feedforward compensation signal, and means for generating a modified feedforward compensation signal for the PA by modifying the feedforward compensation signal based on the moving average of the SA drive signal.

Preferably, the SA has a neutral position relative to the PA when the SA drive signal is not applied. More preferably, the SA is biased toward the neutral position by a flexure. Still more preferably, the SA further includes means for bi-directionally pivoting the SA about the neutral position based on the polarity of the SA drive signal.

The SA may include an arm attached to the PA for movement by the PA, a load beam extending from the arm and a piezoelectric transducer element secured to the load beam and operatively connected to the means for generating the SA drive signal such that a portion of the load beam is flexed by the piezoelectric transducer element based on the SA drive signal.

The SA may include an arm attached to the PA for movement by the PA and a load beam extending from the arm, wherein the load beam has a distal end and a drive end having openings defining a pair of spokes connected to a hub fixed to the arm. A piezoelectric transducer element is attached to the spokes and operatively connected to the means for generating the SA drive signal such that the spokes are flexed by the piezoelectric transducer element based on the SA drive signal, whereby the distal end of the load beam pivots about the hub.

The SA may include an arm attached to the PA for movement by the PA, a load beam extending from the arm, a slider mounted on a distal end of the load beam, a head mounted on the slider, and a micromechanical transducer element secured between the head and the slider, and operatively connected to the means for generating the SA drive signal such that the head is moved relative to the slider by the micromechanical transducer element based on the SA drive signal.

The SA may include an arm attached to the PA for movement by the PA, a load beam extending from the arm, a slider mounted on a distal end of the load beam, and a micromechanical transducer element secured between the slider and distal end of the load beam, and operatively connected to the means for generating the SA drive signal such that the slider is moved relative to the distal end of the load beam by the micromechanical transducer element based on the SA drive signal. Preferably, the movement of the slider relative to the distal end of the load beam caused by the micromechanical transducer element is pivotable about an axis through the slider.

A fourth aspect of the present invention is directed to a disk drive for storing and retrieving data. The disk drive comprises a housing, a rotatable disk mounted within the housing, and a multiple-stage actuator for positioning a head relative to a surface of the rotatable disk. The multiple-stage actuator includes a primary actuator (PA), a secondary (SA) riding piggyback on the PA, and control means for controlling the PA and the SA. The control means includes means for generating a drive signal for the SA, means for calculating a moving average of the SA drive signal, means for generating a feedforward compensation signal, and means for generating a modified feedforward compensation signal for the PA by modifying the feedforward compensation signal based on the moving average of the SA drive signal.

Preferably, the SA has a neutral position relative to the PA when the SA drive signal is not applied. More preferably, the SA is biased toward the neutral position by a flexure. Still more preferably, the SA further includes means for bi-directionally pivoting the SA about the neutral position based on the polarity of the SA drive signal.

A more complete understanding of the present invention may be had by referring to the attached drawings and the detailed description of the present invention which follows.

DESCRIPTION OF THE PREFERRED EMBODIMENTS

Figure 1:
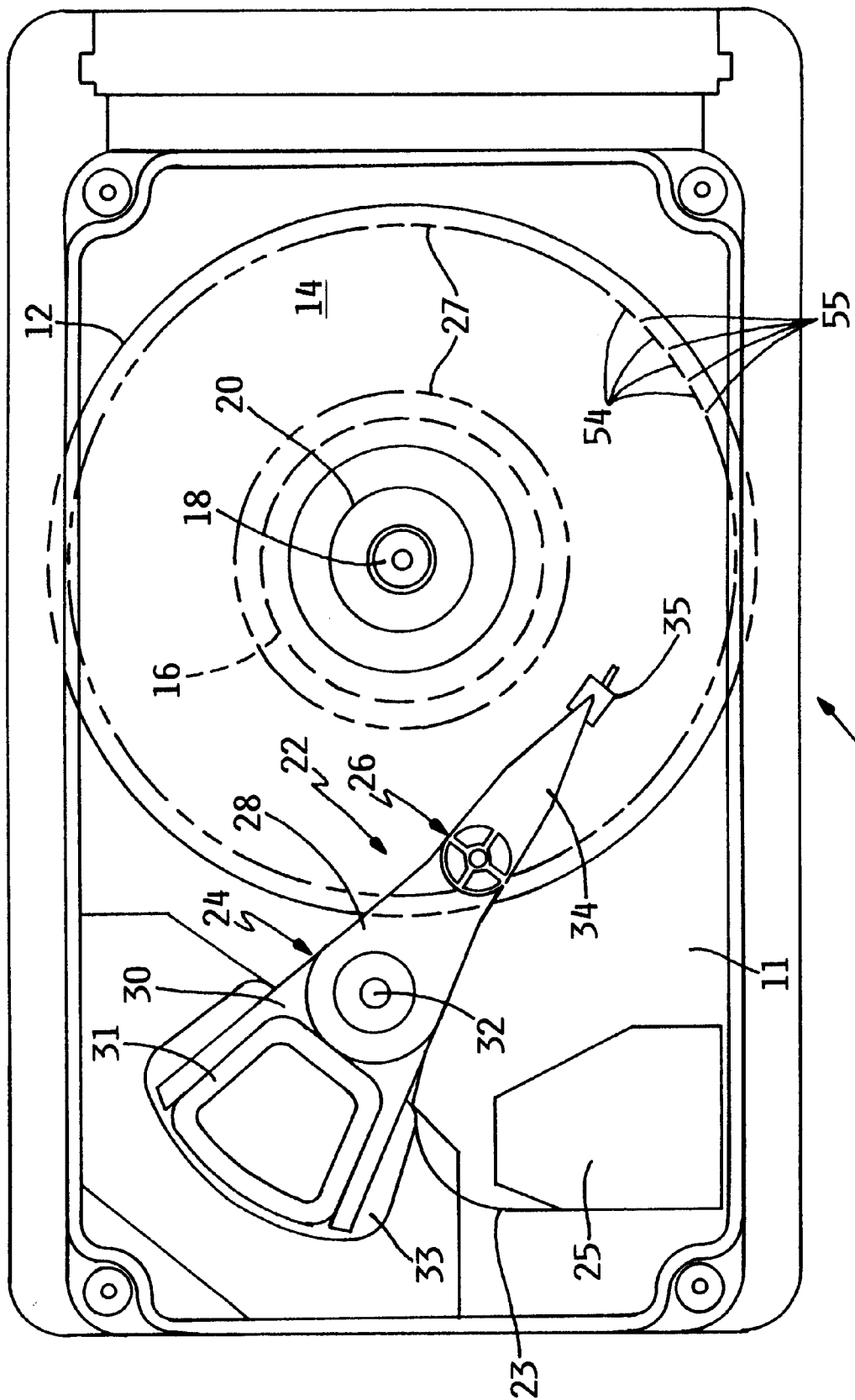
FIG. 1 is a top plan view of a disk drive incorporating the present invention.

The present invention takes advantage of the relationship between the drive signal for a position actuator and the position of that actuator. A position actuator has a steady-state position when the drive signal is not applied thereto, hereinafter referred to as its neutral position. For example, a position actuator may be biased toward its neutral position by a spring such as a flexure. The displacement of a position actuator is provided by applying a drive signal to activation elements, e.g., electromagnetic, piezoelectric or electrostatic elements, of the position actuator. Application of the drive signal causes the position actuator to be displaced from its neutral position by an amount that is related to the current and voltage of the drive signal.

For example, in the case of bi-morph piezoelectric activation elements, the positive or negative displacement of the position actuator away from its neutral position is proportional to the magnitude of voltage and current of the drive signal. This relationship can be expressed as F=KX, where F is the force or torque provided by the current and voltage of the drive signal, K is a constant, and X is the positive or negative displacement of the actuator from its neutral position. The drive signal must be applied continually to maintain the displacement of the position actuator, and thus contains information relating to its position. The present invention uses the information contained in the drive signal applied to a position actuator riding piggyback on another actuator to eliminate the need for an additional sensor to measure the relative position between these actuator stages, e.g., between a primary actuator (PA) and a position-type secondary actuator (SA).

It is desired that the moving average of the drive signal applied to the position actuator be maintained close to zero so that the position actuator is maintained close to its neutral position. This is accomplished by applying to the actuator on which the position actuator is mounted the moving average of the drive signal applied to the position actuator. For example, where a position-type secondary actuator (SA) is mounted on a primary actuator (PA), the PA is supplied with the moving average of the drive signal applied to the SA. Because the average drive signal applied to the position actuator is maintained near zero and because the position actuator can be displaced in either direction relative to its neutral position, the bi-directional range of the position actuator is maximized to cover transient (high frequency) movement with equal capability in either direction.

The position actuator is provided at the slider level and/or the suspension level. At the slider level, a micromechanical actuator attached at the interface between the slider and the head moves the head relative to the slider, or a micromechanical actuator attached at the interface between the suspension and the slider moves the slider relative to the suspension. At the suspension level, a mini-actuator attached at the interface between the actuator arm and the suspension or in the suspension moves the suspension relative to the actuator arm. Preferably, the range of motion of the position actuator is limited to plus or minus a few tracks by mechanical stops.

Disk drives must position each head over the proper radial location to write a track and reposition the head very close to the same location to read the track. It is conventional and well known in the art to provide a feedback mechanism to locate and stably hold the head on a given track. Typically, track accessing and track following is provided utilizing a magnetically written pattern on the disk. A dedicated servo system employs one surface of one disk in the disk stack to provide all the tracking and access information. A sector servo (or embedded servo) system uses small radial sectors between or splitting data sectors on each track of each surface of each disk to provide the tracking and access information. A hybrid servo system uses both to obtain advantages of each type of servo system.

The degree of tracking accuracy, i.e., the ability of the actuator servo to keep the head position discretely over the track, is governed by two factors. One factor is spacial (space), the other is temporal (time). The spacial factor corresponds to the number of servo sectors N around the track, which may be a function of the linear recording density and the fixed block data format. The temporal factor corresponds to the time between servo sectors or the sampling period, which is controlled by the rotational velocity of the disk.

Track misregistration (TMR) error can be separated into two major components, repeatable or synchronous with disk rotation and non-repeatable or asynchronous with disk rotation. The repeatable TMR component (or track runout error), which can be large in case of a disk slip, can be reduced by correction compensation. A correction for radial TMR versus radius is required for a disk drive with a rotary actuator when tracks are written approximately uniformly on the rotary arc rather than in the radial direction. Both the gain and phase effects with radius should be compensated. Both gain and phase effects with radius produce comparable amounts of TMR in the system.

In disk drives with a rotary actuator, the head does not move in a radial direction. For many disk drives, the skew angle of the head has the back end of the head further out on the disk than the front end when the head is at the inner radius. The skew gets progressively larger at larger radii. This is used to advantage in disk drives by writing the tracks nearly uniformly on the arc that the head transverses from the inner radius to the outer radius. Due to the larger skew angles, the written tracks are physically smaller near the outer radius than near the inner radius. The positioning of the tracks on the arc causes the radial track pitch to be smaller at the outer radii than at inner radii, which is consistent with the smaller written tracks. This may vary, however, as the head may be positioned to have zero skew elsewhere between the inner radius and the outer radius.

A radial movement of a disk, such as that due to disk slip, or vibrations producing an apparent out-of-round for the track, moves the disk the same physical distance at any radius. However, in the servo system, the distance is measured in fractions of a pitch. Typically this distance is in 1/512 of a customer track pitch. Since the head is moved at the skew angle for a given radius, the head must be moved further than the radial movement of the disk, and this amount is more significant at the outer radii where the skew angle is larger than at inner radii.

As a result, any compensation for radial TMR that is determined at one radius in a given number of units in the servo system will not be the same value at other radii. For example, the radial TMR difference between the outside diameter (OD) and the inside diameter (ID) can be about 7% for a 3.5" disk drive. At progressively higher track density this has significance as an error in the servo tracking corrections. Also, when a prewritten servo disk is used, there can be significant repeatable runout, thus increasing the magnitude of the error.

The present invention takes advantage of the knowledge of repeatable and non-repeatable track runout error (or runout) present in any disk drive. The present invention applies the knowledge of repeatable and non-repeatable runout to a multiple-stage actuator and makes it possible to achieve a track density of at least 25,000 tracks per inch (tpi).

In a two-stage actuator system, for example, the measured repeatable runout is used as a feedforward signal to a PA on which a secondary position actuator rides piggyback. If the PA is a rotary actuator, the feedforward signal is preferably arc corrected for the arc that the head transverses from the inner radius to the outer radius of the disk. Added to the feedforward signal is a signal proportional to the moving average of the drive signal applied to the secondary position actuator. This moving average is an integral control that is proportional to the time cumulative drift present in the two-stage actuator system, and forces the PA in a direction that minimizes deviation of the secondary position actuator from its neutral position. This minimizes the range requirement for the secondary position actuator, the main purpose of which is to reduce non-repeatable runout.

The figures in the present application show various types of multiple-stage actuators that may be controlled according to the present invention. These multiple-stage actuators are shown for illustrative purposes and are not intended to limit the scope of the present invention as defined in the claims. Other types of multiple-stage actuators may be controlled according to the present invention.

Referring initially to FIG. 1, a disk drive 10 incorporating the present invention is illustrated. Disk drive 10 is illustrated in simplified form sufficient for an understanding of the present invention because the utility of the present invention is not limited to the details of a particular disk drive construction. The disk drive 10 is shown having a base plate 11 on which a magnetic or optical disk 12 is rotatably supported. Although the present invention is applicable to both magnetic and optical disk drives, disk 12 is preferably a rigid magnetic disk. The disk 12 has a recordable surface 14 and is rotationally (counter clockwise as viewed in FIG. 1) driven by a spindle motor 16. Recordable surface 14 is an optical or magnetic recording layer on or within disk 12. The disk 12 is supported by a spindle bearing 18 and hub 20. Although disk drive 10 is shown having a single disk 12, the present invention is also applicable to disk drives having stacked, commonly rotated magnetic or optical disks.

Recordable surface 14 of disk 12 is accessed across its radial dimension by a multiple-stage actuator 22. The multiple-stage actuator 22 includes a rotary primary actuator (PA) 24 of the voice coil motor (VCM) type and a rotary secondary actuator (SA) 26 of the piezoelectric transducer type such as that disclosed in commonly assigned, copending patent application U.S. Ser. No. 08/289,509, Zine-Eddine Boutaghou and Hal H. Ottesen, filed Aug. 30, 1994 now U.S. Pat. No. 5,521,778. Although preferably rotary, PA 24 and SA 26 may instead be linear. Data is recorded in concentric, radially spaced data information tracks 27 arrayed on recordable surface 14 of disk 12. Data may alternatively be recorded in spiral, radially spaced data information tracks.

The PA 24 includes an actuator arm 28 joined to an armature arm 30 with an actuator pivot 32 therebetween. PA 24 is of the VCM type, wherein the armature arm 30 has a voice coil 31 secured thereto that cooperates with a permanent magnet assembly 33 mounted to base 11. The PA need not be of the VCM type, however, and may instead be driven by other conventional activation elements such as piezoelectric or electrostatic elements. Also, PA need not be a rotary actuator, and may instead be a linear actuator. A drive signal generated by a servo processor 60 (FIG. 3) is provided through a flexible cable 23 to voice coil 31 to rotate actuator arm 28 about actuator pivot 32. The actuator arm 28 is relatively rigid to insure positional stability. Extending from the distal end 29 (FIG. 2) of actuator arm 28 is a load beam 34 which supports a slider 35 and acts to bias slider 35 against the floating force created by the air passing between slider 35 and the surface of rotating disk 12. Although not shown, the slider 35 includes a head (transducer, objective lens or mirror) for writing data to and/or reading data from data information tracks 27 on recordable surface 14 of disk 12. Signals travel back and forth between the head and an arm electronics (AE) module 25 via flexible cable 23 and head lead wires (not shown) that are routed along actuator arm 28 and load beam 34 and electrically connect flexible cable 23 to the head.

Figure 2:
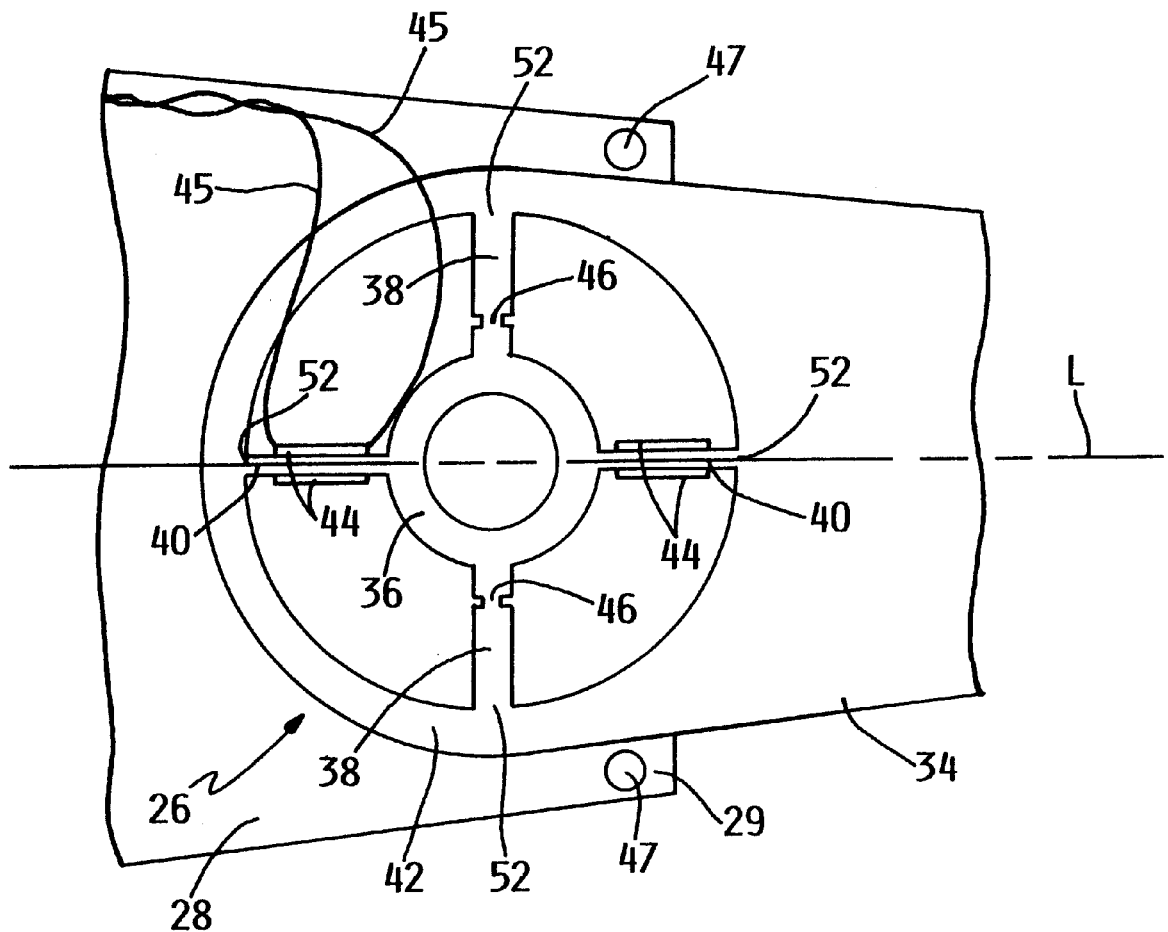
FIG. 2 is an enlarged view of the secondary actuator (SA) of the disk drive of FIG. 1.

SA 26 is disposed between actuator arm 28 and load beam 34. Although preferably rotary, SA 26 may instead be linear. Reference is now made to FIG. 2 for a more detailed discussion of the structure of the actuator arm 28, load beam 34 and SA 26. A small portion of the distal end 29 of actuator arm 28 is illustrated in FIG. 2. Overlying and attached to the distal end 29 of actuator arm 28 is SA 26. SA 26 includes a central hub 36 which acts as an attachment point for attaching SA 26 to the distal end 29 of actuator arm 28. The central hub 36 is attached to the distal end 29 of actuator arm 28 by conventional attachment techniques such as gluing, swaging, staking, riveting, or the like. The central hub 36 is further provided with a plurality of radially extending spokes 38,40 divided into two pairs, a first pair of spokes 38 and a second pair of spokes 40. The spokes 38,40 are disposed symmetrically with respect to the longitudinal axis L of the load beam 34 in its unflexed, neutral position. The first pair of spokes 38 serve as stabilizing connections between central hub 36 and a ring 42. The second pair of spokes 40 also interconnect hub 36 and ring 42. Ring 42 is extended on at least one side to form load beam 34.

A pair of piezoelectric transducer elements 44 are fixedly attached to the sides of spokes 40. Alternatively, piezoelectric transducer elements 44 may be attached to spokes 40 at other positions, or a single or three or more piezoelectric transducer elements 44 may be attached to spokes 40. Also, other types of activation elements, such as electrostatic and electromagnetic, may alternatively be used instead of piezoelectric transducer elements 44. Spokes 40 act as the driving spokes for the SA 26. Each piezoelectric transducer element 44 is supplied with a drive signal through flexible cable 23 and a pair of transducer lead wires 45 (only one pair is shown in FIG. 2 for the sake of clarity) which electrically connects flexible cable 23 to the piezoelectric transducer element 44. Piezoelectric transducer elements 44 are bonded by a glue or adhesive or other suitable attaching technique to the sides of the spokes 40 in order to provide the deforming forces necessary to cause spokes 40 to bend. As each spoke 40 is bent, ring 42 is rotationally translated relative to central hub 36.

Spokes 38, although serving as stabilizing spokes, are further provided with a reduced cross-sectional area 46 which forms a bendable hinge. The reduced cross-sectional area 46 localizes the bending which will occur in spokes 38 and positionally defines the points about which movement of load beam 34 may occur.

Although two pair spokes are used in the SA shown in FIGS. 1 and 2, any number of spokes may be used. For example, the stabilizing spokes 38 may be omitted from the SA 26. Alternatively, a single stabilizing spoke 38 having a reduced cross-section area 46 may extend generally coaxially with the longitudinal axis L of load beam 34 in its unflexed, neutral position, while each of a pair of driving spokes 40 carrying piezoelectric transducer elements 44 extends at an angle of about 120 degrees from each other and the single stabilizing spoke 38.

The stability of load beam 34 both around its longitudinal axis L, and in the direction perpendicular to the plane of load beam 34, is in large part provided by the arrangement of the spokes extending from central hub 36 to ring 42.

Because piezoelectric transducer elements 44 are bonded to the sides of spokes 40, whenever elements 44 are provided with electrical potential and current sufficient to cause their deformation, elements 44 will cause the actual bending of the spokes 40. As the spokes 40 are bent, ring 42 will be caused to make some translation about central hub 36. The stabilizing spokes 38 and particularly hinge 46 will provide constrained guidance to the movement of ring 42 about hub 36. The movement of load beam 34 is limited by mechanical stops 47 mounted on the distal end 29 of actuator arm 28.

Piezoelectric transducer elements 44 preferably should be bi-morph in nature. Bi-morph elements will cause bending when energized by an electrical potential and current. The extent of bending is dependent upon the magnitude of the electrical potential and current of the signal provided, and the direction of bending is a function of the polarity of the electrical signal.

The degree or extent of the bending of each spoke 40 may be influenced and controlled by varying the voltages and the current to each of the separate piezoelectric transducer elements 44. Due to the independent nature of each of the piezoelectric transducer elements 44, the piezoelectric transducer elements 44 can provide either an additive or a canceling bending stress to the spoke 40 to which the piezoelectric transducer elements 44 are attached. Further, since two spokes 40 are provided with the piezoelectric transducer elements 44, the bending stresses on the pair of spokes 40 likewise may be either additive or canceling.

Thus, it can be seen that with the appropriate set of electrical signals provided to the piezoelectric transducer elements 44, the elements 44 on any one of the spokes 40 may be caused to bend in the same direction; and since they are bonded and attached to the sides of the spokes 40, the bending effect of each of the bi-morph piezoelectric transducer elements 44 will be additive in causing deformation to the individual spoke 40 to which elements 44 are attached. Should the elements 44 on the spokes 40 be similarly controlled, the effect may be additive causing more significant pivotal translation of ring 42 about central hub 36. As ring 42 is translated, the stresses created in spokes 40 will be partially transmitted to the spokes 38 respectively. The stress will be concentrated at the reduced cross-sectional area 46 formed in each of the stabilizing spokes 38. The reduced cross-sectional area 46 will act to precisely locate the most significant bending of the stabilizing spoke 38 at a precisely defined location relative to central hub 36 and distal end 29 of actuator arm 28.

By reversing the signals previously provided to each of the piezoelectric transducer elements 44, the bending of the piezoelectric transducer elements 44 may be reversed. This will cause the load beam 34 to be moved in the opposite direction through an opposite but analogous distortion of the bending spokes 40 and the stabilizing spokes 38. Upon the termination of the signals supplied to the piezoelectric transducer elements 44, the elements 44 will restore to substantially their neutral position, thus returning spokes 40 to their unbent and unstressed condition. In the event that hysteresis occurs, a small reverse polarity signal provided to elements 44 will positively restore spokes 40 to their undeflected condition.

Piezoelectric transducer elements 44 are particularly useful in this type of an environment since they are capable of creating only limited distortion in spokes 40. With load beam 34 having an arm length of approximately five times the radius of the ring 42, an extremely small deflection of a junction 52 of ring 42 and spokes 38 will be multiplied by the relative lever arm lengths of junction 52 and load beam 34 to provide a much larger displacement of the slider 35.

Referring back to FIG. 1, data information tracks 27 include a plurality of segments or data sectors 54, each for containing a predefined size of individual groups of data records which are saved for later retrieval and updates. Between the data sectors are radial servo sectors 55, each containing coded servo data. As disk 12 is rotating, servo sectors 55 will cross under the head of slider 35 at regular intervals. These intervals are referred to as sampling periods. Each time a servo sector 55 is crossed, the encoded servo data is read by the head of slider 35.

Figure 3:
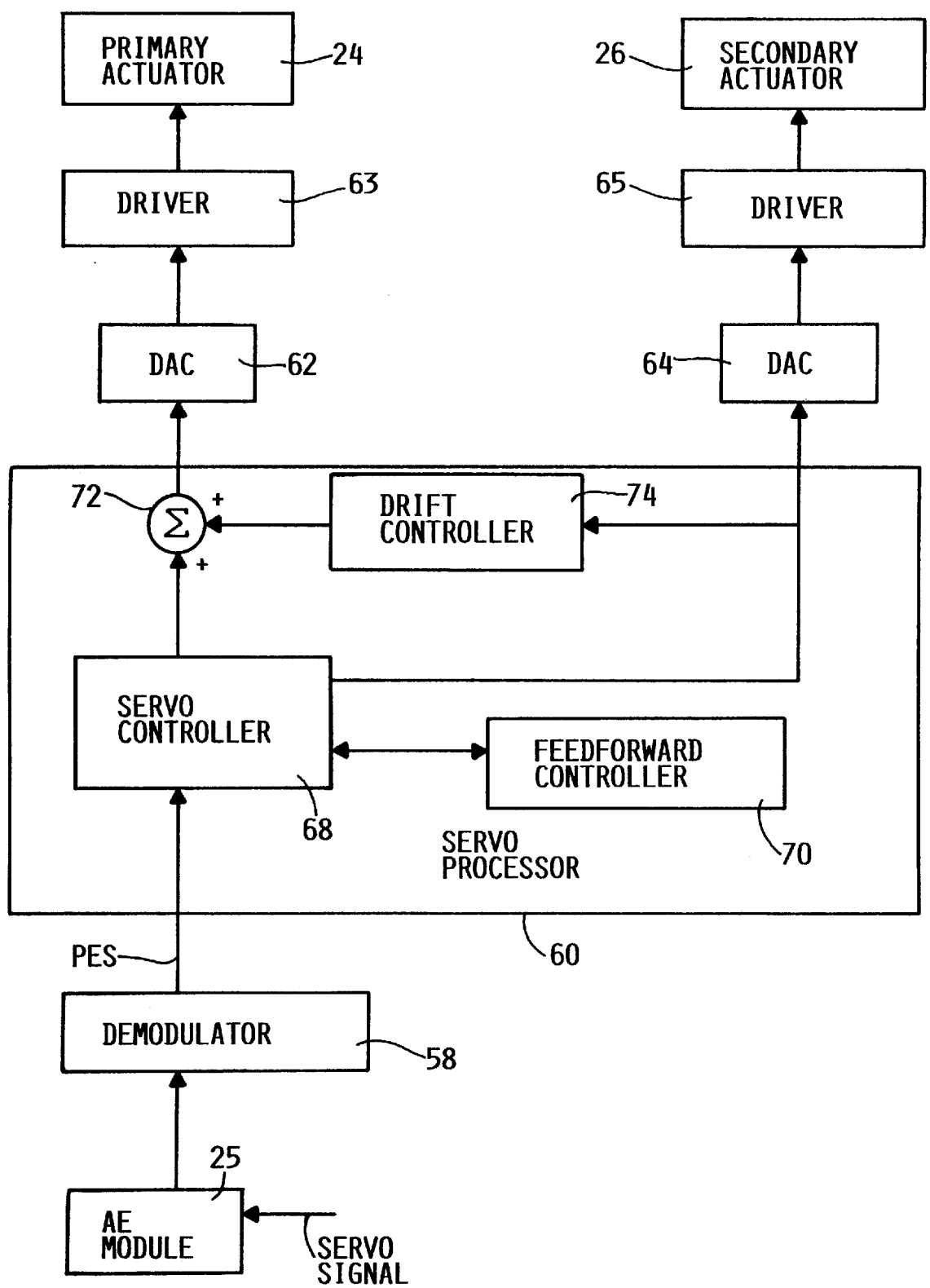
FIG. 3 is a block diagram of an apparatus for controlling the multiple-stage actuator of the disk drive of FIG. 1.

Referring now to FIG. 3, there is shown a block diagram illustrating an apparatus for controlling multiple-stage actuator 22. A servo signal, i.e., the encoded servo data read from radial servo sectors 55 by the head of slider 35, is amplified by arm electronics (AE) module 25. The output of AE module 25 is supplied to a servo demodulator 58 that converts the encoded servo data to a digital position error signal (PES). The PES is fed into a servo processor 60. The servo processor 60 has mode-controlling servo algorithms stored in microcode that provide advanced accessing and tracking servo with feedforward compensation. The feedforward compensation is preferably rotary actuator arc corrected.

One output of servo processor 60 is fed into a digital-to-analog converter (DAC) 62 where it is converted and held to an equivalent analog value that is smoothed and converted to a current by a driver 63. This current is supplied to voice coil 31 of PA 24 through flexible cable 23. During a seek mode, the current from driver 63 causes PA 24 to move the head of slider 35 toward a target track. Alternatively, during short seeks, i.e., seeks of only a few tracks, it may be preferable to perform an initial motion (fast) using SA 26, and the current from driver 63 would cause PA 24 to follow more slowly. During a settle mode and a track follow mode, the current from driver 63 causes PA 24 to compensate for repeatable track runout error (which compensation is preferably rotary actuator arc corrected) and for drift between PA 24 and SA 26.

Another output of servo processor 60 is fed into a DAC 64 where it is converted and held to an equivalent analog value that is smoothed and converted to a current by a driver 65. This current is supplied to piezoelectric transducer elements 44 of SA 26 through flexible cable 23 and transducer lead wires 45. During the seek mode, the current from driver 65 causes load beam 34 of SA 26 to be clamped against one of the mechanical stops 47 on actuator arm 28. Alternatively, during short seeks, i.e., seeks of only a few tracks, it may be preferable for the current from driver 65 to cause SA 26 to perform an initial motion (fast), and PA 24 would follow more slowly. During the settle mode and the track follow mode, the current from driver 65 causes SA 26 to move in the direction to reduce the PES, i.e., to compensate for non-repeatable track runout error and any remaining repeatable track runout error. Because the deformation of piezoelectric transducer elements 44 is caused by potential and current, driver 65 need not convert the output of DAC 64 to a current, but may instead convert this output a voltage or a combination of current and voltage.

A servo controller 68 of servo processor 60 receives the PES from demodulator 58 and a feedforward compensation signal from a feedforward controller 70. The feedforward compensation signal from feedforward controller 70 provides control information for both magnitude and phase compensation correction versus track number or change in radius and, if desired, for pseudo sector correction compensation.

Servo controller 68 has mode-controlling servo algorithms stored in microcode. Servo controller 68 operates in four basic types of servo modes: (1) Calibration mode, (2) Seek mode, (3) Settle mode, and (4) Track follow mode.

Calibration Mode

The calibration mode will typically be entered when disk drive 10 is powered on and, if desired, during idle periods of operation. In the calibration mode, servo controller 68 causes PA 24 to be clamped against its outer (or inner) mechanical stop (not shown) and SA 26 to be clamped against its corresponding outer (or inner) mechanical stop 47. With the actuators clamped against their respective mechanical stops, servo controller 68 provides the PES to feedforward controller 70. The feedforward controller 70 determines a reference feedforward correction signal by averaging and filtering the PES for each servo sector 55 on the outer (or inner) track over several disk revolutions. The reference feedforward signal is stored in a RAM (not shown) in harmonic form. The reference feedforward correction signal is modified by feedforward controller 70 according to one of the various techniques discussed below to generate the feedforward compensation signal for any selected track.

Seek, Settle and Track Follow Modes

Figure 4:
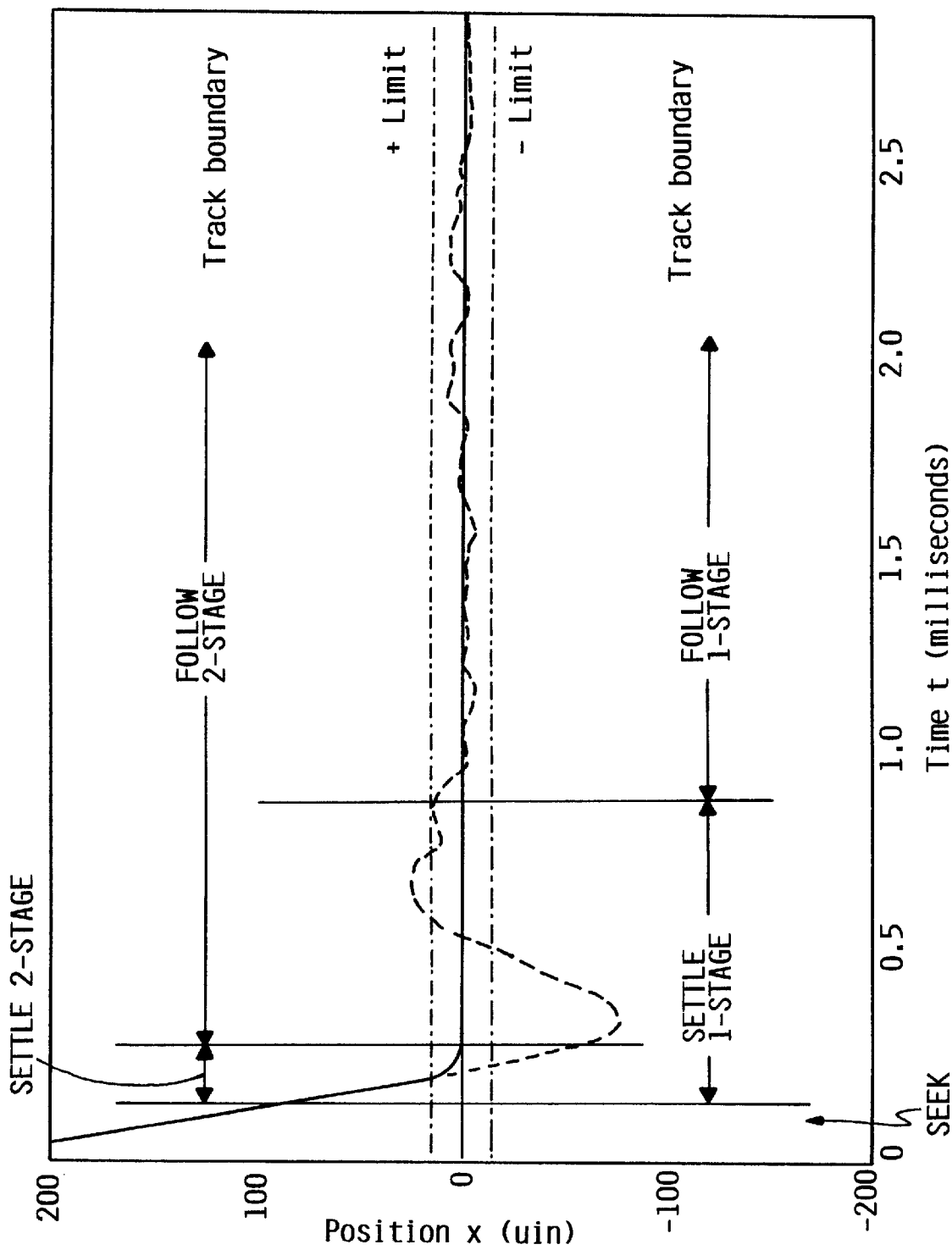
FIG. 4 is a chart illustrating the improved seek, settle and track follow modes for the multiple-stage actuator of the disk drive of FIG. 1 shown in solid line and those of a conventional single-stage actuator shown in dotted line.

The seek, settle and track follow modes for multiple-stage actuator 22 are shown as a solid line in FIG. 4. Also in FIG. 4, the seek, settle and track follow modes of a conventional single-stage actuator are shown for comparison as a dotted line. These servo modes are used to access any selected track 27 (i.e., target track) on the recordable surface 14 of disk 12 and to follow the target track, preferably with the lowest possible TMR.

The invention permits a significant reduction in the average seek time (i.e., the time to move across ⅓ of the recorded data band and settle on a target track) because the time required to settle on the target track is greatly reduced.

Seek Mode

During the track seek mode the head is moved from a present track to a new location very near the target track. Preferably, this is accomplished as fast as possible in a smooth, non-jerky manner so as to minimize any unnecessary excitation of mechanical resonances in disk drive 10, because such excitation will cause a mechanical ringing problem during the track follow mode. As is typical in conventional high performance disk drives, the seek mode is implemented as a derivative (velocity) type of control with constant monitoring of the remaining distance to the target track. FIG. 4 shows that the seek mode according to the invention is no faster than obtained by conventional single-stage actuator. In the track seek mode, servo controller 68 causes SA 26 to be clamped against its outer (or inner) mechanical stop 47. This decouples PA 24 from the dynamics of SA 26. Also in the seek mode, servo controller 68 causes PA 24 to operate under closed loop velocity control with the feedforward compensation signal applied. The angular velocity of PA 24 is forced to follow a feedforward modified, ideal angular velocity profile that will provide the shortest possible seek time with minimum jerk such that the head arrives at the target track at a very small angular velocity. The angular velocity of PA 24 is estimated by servo controller 68 using the PES obtained for each servo sector 54 during the seek process and a conventional algorithm, such as a Kalman type reduced order estimator. At a predetermined position away from the target track, e.g., within one track pitch, servo controller 68 opens the closed loop velocity control loop around PA 24 so that only the feedforward signal will drive PA 24. The servo controller 68 now switches to the settle mode.

Alternatively, during short seeks, i.e., seeks of only a few tracks, it may be preferable for servo controller 68 to cause SA 26 to perform an initial motion (fast), and to cause PA 24 to follow more slowly. Preferably, the range of the stroke of SA 26 is about ±2 to ±3 track pitches so SA 26 may be used for short seeks.

Settle Mode

During the settle mode the center of the head is guided to within a predetermined position error tolerance, e.g., ±5% of the track pitch, of the center line of the target track. The angular velocity of PA 24 is preferably very low when servo controller 68 switches to the settle mode. In the settle mode, servo controller 68 maintains open loop control of PA 24 by providing only the feedforward signal thereto. Also in the settle mode, servo controller 68 causes SA 26 to be unclamped from its outer (or inner) mechanical stop 47 and closes a proportional-derivative (PD) loop around SA 26. Alternatively, a proportional-integral-derivative (PID) loop may be closed around SA 26. In either case, the drive signal from servo controller 68 causes SA 26 to move in the direction to reduce the PES, i.e., to compensate for non-repeatable track runout error and any remaining repeatable track runout error. Due to the feedforward open loop control of PA 24, SA 26 is effectively decoupled from the dynamics of PA 24 as long as the motions required of SA 26 are within the range of its stroke.

In conventional single-stage actuators, the settle mode is the most difficult mode to control and is one of the largest contributors to TMR. This situation arises from two distinct sources. The first source is vibrations in mechanical components induced by jerk associated with fast actuator movements during the seek mode. These vibrations take time to decay. The second source is the nonlinear, hysteretic behavior exhibited by both the actuator pivot bearing and the actuator flexible cable. These effects can be eliminated in the present invention. Preferably the bandwidth of SA 26 is much larger, e.g., 5–10 times, than that of PA 24. Accordingly, jerk induced vibrations are quickly compensated for by motions of SA 26. Moreover, because SA 26 is effectively decoupled from the dynamics of PA 24, the non-linear, hysteretic behavior exhibited by flexible cable 23 and the bearings of actuator pivot 32 has no effect. As shown in FIG. 4, the settle mode according to the present invention is much faster than that of a conventional single-stage actuator.

Track Follow Mode

During the track follow mode the center of the head is maintained as close to the track center line as possible for reading and writing information. The angular velocity of PA 24 is preferably very low when servo controller 68 switches to the track follow mode. In the track follow mode, servo controller 68 closes a proportional-integral-derivative (PID) loop around SA 26. The drive signal from servo controller 68 causes SA 26 to move in the direction to reduce the PES, i.e., to compensate for non-repeatable track runout error and any remaining repeatable track runout error. Also in the track follow mode, servo controller 68 maintains open loop control of PA 24 but provides a modified feedforward signal thereto. The feedforward signal is modified by a summer 72 which adds thereto a moving average of a drive signal for SA 26. The moving average compensates for drift between PA 24 and SA 26 and is calculated by a drift controller 74 based on measurements of the drive signal for SA 26 during a predetermined portion of disk rotation. Due to the modified feedforward open loop control of PA 24, SA 26 is effectively decoupled from the dynamics of PA 24 as long as the motions required of SA 26 are within the range of its stroke.

Ideally with proper feedforward to PA 24, SA 26 would only "see" the non-repeatable component of track misregistration (TMR) in the track follow mode. In practice, however, drift of PA 24 which is always present. Drift is a slowly varying, low frequency variable, while non-repeatable TMR is random with mean of zero. Because SA 26 is biased toward its neutral position, if there were no drift then the average of the drive signal for SA 26 over a given time span would be close to zero. This is because non-repeatable TMR has zero mean. Hence it is possible to estimate the drift by averaging the drive signal for SA 26 over a predetermined period of time (e.g., a predetermined number of servo sectors). This is accomplished by drift controller 74. For example, if the disk is spinning at 7200 RPM and the track that is being followed has 100 servo sectors per revolution, drift controller 74 averages the drive signal for the SA over 25 servo sector samples (e.g., ¼ of a disk revolution). Thus, according to this example, the average may be updated about every 2 milliseconds (i.e., at a sampling rate of about 500 Hz) to provide a moving average. The estimated and periodically updated drift is added to each of the feedforward signal values by summer 72, and thus reduces the relative drift between PA 24 and SA 26.

Assume, for example, that PA 24 in the track follow mode is drifting towards the inside diameter (ID) of disk 12. If the moving average were not added to the feedforward signal, SA 26 following a target track would try to compensate for this drift by moving from its neutral position towards the outside diameter (OD) of disk 12. This can only go on for so long until the range of SA 26 has been exceeded. However, if the moving average is added to the feedforward signal, then PA 24 will be forced towards the OD of disk 12, thereby minimizing the relative drift. The SA 26 will benefit from this by operating near its neutral position.

Thus according to the invention, there is no need for an additional sensor for measuring the relative position between the PA and the SA. The use of such an additional sensor, as in conventional two-stage actuators of optical disk drives, has many disadvantages including cost and mass, and the need for signal cabling thereto. These disadvantages become more prominent as the number of secondary actuators in the disk drive increases. For example, a drive with four disks having a total of eight disk surfaces and eight heads would require eight sensors, each sensing the relative position between a PA and one of eight secondary actuators (SA) riding piggyback on the PA. Moreover, noise from the sensor can adversely influence the read performance of the head.

In conventional single-stage actuators, a major difficulty in the track follow mode is the very low angular velocity of the actuator. This increases the stiction/friction hysteresis in the actuator bearings, causing the servo system to go into a small but troublesome limit cycle due to the non-linearity of the hysteresis. Actuator bearing hysteresis may change irregularly with temperature and humidity, and may vary from disk drive to disk drive. Thus, actuator bearing hysteresis is difficult to predict. Another source of difficulty is the nonlinear, hysteretic behavior exhibited by the actuator flexible cable, which makes it difficult to provide the right initial value for the integrator (capacitor) in the PID loop. These effects can be eliminated or minimized in the present invention. Because SA 26 is effectively decoupled from the dynamics of PA 24, the non-linear, hysteretic behavior exhibited by the bearings of actuator pivot 32 and the flexible cable 23 has no effect.

Another major difficulty in the track follow mode of conventional single-stage actuators is external shock and vibration. The invention can be used to minimize the effect of external shock and vibration. Preferably the bandwith of SA 26 is much larger, e.g., 5–10 times, than that of PA 24. Accordingly, TMR due to external shock and vibration that falls within the range of the stroke of SA 26 can be greatly minimized. The range of the stroke of SA 26 necessary to minimize TMR induced by external shock and vibration is reduced due to drift compensation.

Although discussed as separate modes, the settle mode and the track follow mode may be combined into a single mode.

Feedforward With Rotary Actuator Arc Compensation

Because PA 24 is a rotary actuator, it is preferable to provide rotary actuator arc compensation correction such as that disclosed in commonly assigned, copending patent application U.S. Ser. No. 08/112,408, Earl A. Cunningham, Kevin J. Erickson and Hal H. Ottesen, filed Aug. 26, 1993. Systematic error can be effectively eliminated for each individual track using a very simple algorithm to yield optimal tracking performance for each individual data surface. The Fourier coefficients are simply modified as functions of the track position to obtain the correct runout compensation for a specific track before the inverse Fourier transform is taken.

Figure 5:
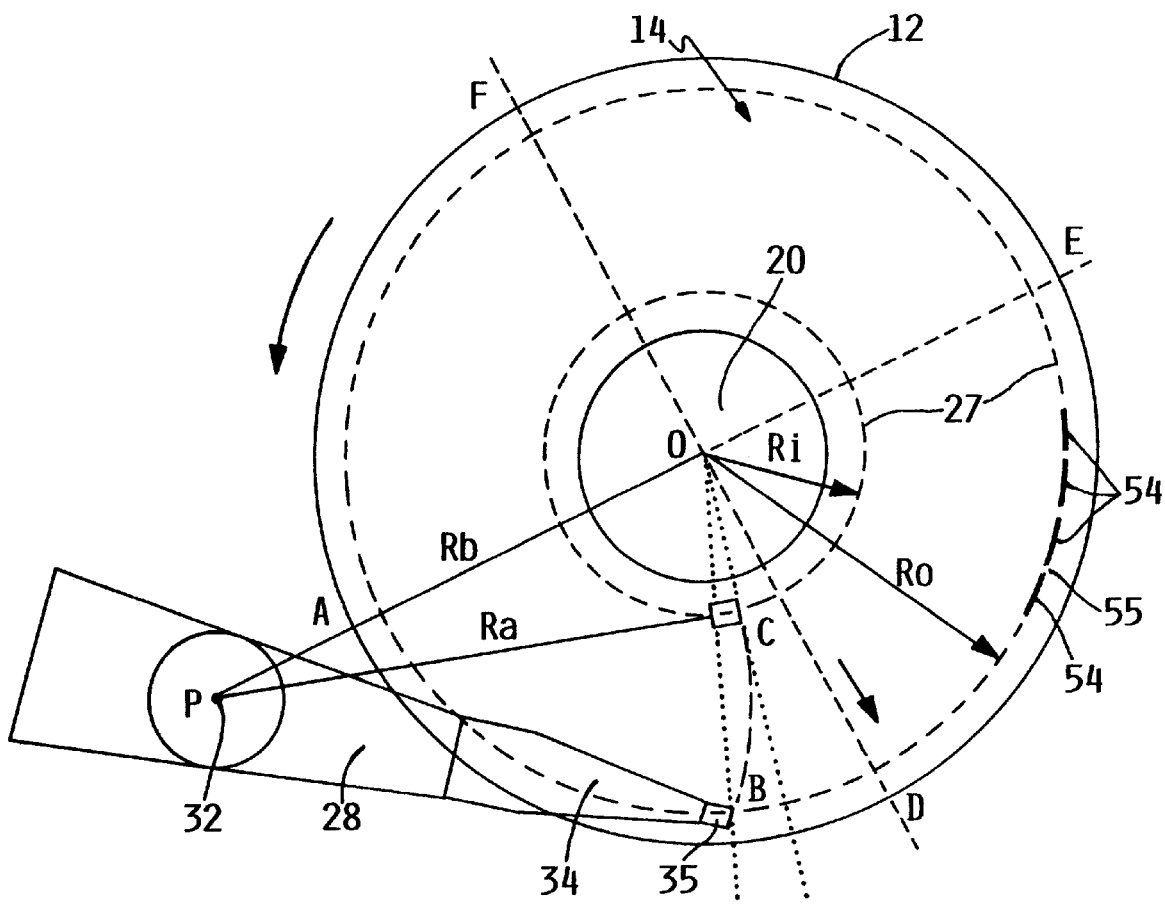
FIG. 5 is an expanatory diagram of the disk and actuator of the disk drive of FIG. 1 showing the arcuate movement of the head caused by the rotary primary actuator (PA).

FIG. 5 is an expanatory diagram of disk 12 and multiple-stage actuator 22 of the disk drive shown in FIG. 1 showing the arcuate movement of the head caused by rotary PA 24. The angle $\alpha(r)$ defined by A-O-X in FIG. 5, where X is the intersection between a circle of radius r centered at O and the arc B-C can conveniently be found from the Law of Cosines. This angle is referred to as $\alpha(r)$.

The cosine to $\alpha(r)$ is given in Equation 1 below:

$$\cos\alpha(r) = \frac{R_b^2 + r^2 - R_a^2}{2rR_b} \quad (1)$$

The cosine to the angle $\alpha(R_o)$ is found by substitution of $r=r_o$ in Equation 1 above, giving:

$$\cos\alpha(R_o) = \frac{R_b^2 + R_o^2 - R_a^2}{2R_bR_o} \quad (2)$$

It can be shown that the difference angle $\theta(r)$ between $\alpha(r)$ and $\alpha(R_o)$ can be approximated by the simple algorithm derived from simulations:

$$\theta(r) = \frac{0.555}{R_b}\left[1 - \frac{R_b^2 - R_a^2}{rR_o}\right](R_o - r) \quad (3)$$

Let L be an arbitrary logical track number corresponding to a track of radius r, and let $L_o$ be the total number of tracks in the data band defined by $(R_o - R_i)$. Furthermore, let L be equal to zero for $r=R_o$, and $L=L_o$ for $r=R_i$. It is now possible to express Equation 3 in terms of L as $$\theta(L) = K_1\left[1 - \frac{K_2}{K_3 - L}\right]L \quad (4)$$

Where coefficients $K_1$, $K_2$ and $K_3$ are given by $$K_1 = \frac{0.563(R_o - R_i)}{L_oR_b} \quad (5)$$

$$K_2 = L_o\frac{R_b^2 - R_a^2}{R_o(R_o - R_i)} \quad (6)$$

and finally $$K_3 = M_o\frac{R_o}{(R_o - R_i)} \quad (7)$$

For a certain 3.5" drive with $R_a$=52 mm, $R_b$=57 mm, $R_o$=45.52 mm, $R_i$=20.68 mm, and at a track density $M_o$=3300 tpi, the total number of data tracks $L_o$=3227. The values for the K's are $K_1$=7.603×10$^{-5}$, $K_2$=1555.4 and $K_3$=5913.6. The corresponding angles $\alpha(R_o)$ and $\alpha(R_i)$ are 59.71° and 65.63°, respectively. The difference angle at the inner track, i.e., track 3227, using the approximation formula in Equation 4 yields $\theta(L_o)$=5.9189° compared to the correct value of 5.9195°. This corresponds to a maximum error of about 0.01%.

Nonlinear phase error is only a function of the hard disk drive geometry as illustrated in FIG. 5. It is therefore a predictable and systematic error and can be calculated within a very small margin for any logical track L using Equation 4.

Assume for example that the runout is measured for each of N sectors at the outer track (OD) and let us designate the measurement by x(n), where n is an integer n=0, 1, ..., N−1. Furthermore, assume that the first harmonic runout component $x_1(n)$ is extracted from the OD measurement x(n). This can easily be done by Fourier Harmonic Filtering. Let the Discrete Fourier Transform (DFT) of x(n) be $$X(k)=A(k)+jB(k) \quad (8)$$

where A(k) and B(k) are the real and imaginary Fourier coefficients, respectively. The index k takes on integer values k=0, 1, ..., N−1.

Considering that the fundamental runout component $x_1(n)$ corresponds to k=1, then it can shown that $$x_1(n) = \frac{2}{N}[A(1)\cos w_o n - B(1)\sin w_o n] \quad (9)$$

where $w_o$ is the discrete frequency for N servo sectors and where A(1) and B(1) are given by $$A(1) = \sum_{n=0}^{N-1} x(n)\cos w_o n \quad (10)$$

$$B(1) = -\sum_{n=0}^{N-1} x(n)\sin w_o n \quad (11)$$

It can be shown that for $\theta(L)\ll 1$ radian, which is the case here, that the phase corrected feedforward compensated first harmonic runout signal $x_1(n,L)$ can be approximated by the equation $$x_1(n, L) = \frac{2}{N}[C(1, L)\cos w_o n - D(1, L)\sin w_o n] \quad (12)$$

where the first harmonic phase corrected Fourier coefficients for track L C(1,L) and D(1,L) are $$C(1, L)=A(1)+\theta(L)B(1) \quad (13)$$

$$D(1,L)=B(1)-\theta(L)A(1) \quad (14)$$

The first harmonic phase corrected Fourier coefficients C(1,L) and D(1,L) in Equations 13 and 14 are easily calculated from Equations 4, 10 and 11.

Application of the phase corrected feedforward runout signal x(n,L) in Equation 12 for an arbitrary track L by feedforward controller 70 will optimize the feedforward compensation provided to servo controller 68, and ultimately to PA 24, and reduce the systematic error to near zero.

Alternatively, a simple quadratic correction for amplitude corrected feedforward compensation as follows can provide excellent fit to the actual curve, making an assumption that the angles are small and the curve fit is for a small range. First, the radial pitch equals the pitch on the arc multiplied by the cosine of the skew angle. The cosine is the square root of 1-sine$^2$. The sine of the skew angle is approximately the skew angle in radians. The skew angle can be approximated by using an offset and an amount proportional to a radial distance. Then, even though the track pitch varies somewhat, a radial distance is related approximately linearly to a number of tracks.

Now, let $N_c$=logical track number, where $N_c$=0 on the outer track, and $N_c$= 4118 on the inner track. Also, for reference, $N_c$=3002 at the switch radius where the skew angle is 11.27 degrees.

With the previous approximations, the cosine of the skew angle is approximated as:

$$\cos(\text{skew}) = 1 - \left(\frac{(N_1 - N_c)}{N_2}\right)^2 \quad (15)$$

where $N_1$ is the offset, and $N_2$ is a scaling constant.
For $N_c$=0 at SKEW=22.36 degrees
$N_c$=4118 at SKEW=6.57 degrees
Then $N_1$=5831, and $N_2$=21144
Then using:
Pitch(approx)=6.23 um $(1-((N_1-N_c)/N_2)^2)$ and comparing to actual values we have:

| RADIAL POSITION | ACTUAL RADIAL POSITION | PITCH (approx) |
|---|---|---|
| Inner Radius 20.68 mm | 6.19 μm | 6.19 μm |
| Switch Point 27.50 mm | 6.11 μm | 6.12 μm |
| Outer Radius 45.52 mm | 5.76 μm | 5.76 μm |

Note that for a given radial distance of repeatable runout (RRO), the number of servo counts is inversely proportional to the radial pitch. If RRO counts are measured at track zero (at $R_o$ in FIG. 5), then the RRO counts at another track are defined as follows:

$$\frac{\text{RRO Counts}}{(\text{TRACK } N_c)} = \frac{\text{RRO Counts}}{(\text{TRACK 0})} \left(\frac{N_2^2 - N_1^2}{N_2^2 - (N_1 - N_c)^2}\right) \quad (16)$$

If desired, the factor on the right can be further simplified by the series for the reciprocal, using only up to the second order term in the numerator. Also, moderate improvement is provided using only up to the linear term in the series.

Following is a Table 1 listing a more complete calculation of the effect of a uniform track density on the arc, which generates a nonlinear variation with radius. The ACTUATOR ANGLE in degrees is the angle from the actuator axis to disk axis line, and to the actuator axis to the head gap line. For this example, the distance from the actuator axis to disk axis is 56.50 mm. The distance from actuator axis to gap is 55.00 mm. These distances along with the radius describe a triangle, and the Law of Cosine relates the angles to the sides. The distance along the arc is assumed to be linearly proportional to the track number. The inner track radius, outer track radius and number of tracks defines the track pitch on the arc. This geometry is also used to calculate the circumferential phase error. This was taken with the zero reference at track zero, which is at the outer data radius. The phase error is the change in the radial line to the head gap compared to the line with the head at the outer track.

The CORRECTION-ACTUAL column is the reciprocal of the COSINE of the head skew angle. This is the factor applied to the servo counts to move the same distance compared to the straight radial distance. If a measurement is taken at one radius, the amount to move at a second radius can be obtained by dividing by the factor for the first radius and multiplying by the factor for the second radius.

The CORRECTION-APPROX is a quadratic approximation of the correction from the previous column, fitting the 000 track, the 4134 inner track, and the 2067 middle track. There is a 7.4% difference between the inner and outer values, so a fixed fraction of a track runout correction would lead to a 7.4% error on the opposite end of the band. Note that the simple quadratic fit has a very small maximum error of 0.00019.

However, even if the radial magnitude of a correction is perfect, it will not have the right result if it is not applied at the correct phase angle of the disk's rotation. Note in Table 1 that the PHASE ERROR has a range of 11.05 degrees. If a perfect amplitude correction for the inner track were applied with the phase from the outer track, there would be a residual error of 19% of the correction.

The last column shows a quadratic approximation of the phase error. The selection of coefficients here left a maximum error of 0.15 degrees. With this correction, the residual maximum error would be about the sine of this angle, or 0.0026 or about ¼%.

This calculation was obtained assuming the track density was perfectly uniform on the arc. This is a fair approximation. However, providing some variation of track density on the arc allows packing the tracks a little more tightly where there is better performance, thereby obtaining a little more capacity. In general, the center of the band can be packed 2 or 3 percent more than the ends and then applied in an approximate quadratic variation. Although the following Table 1 does not take this effect into account, it would only require a slight change in the coefficients to include it. Thus we could also compensate for this added variation.

TABLE 1

| TRACK N | ACTUATOR ANGLE ERROR | RADIUS mm | CORRECTION ACTUAL | CORRECTION APPROX | PHASE ERROR ACTUAL (deg) | PHASE ERROR APPROX (deg) |
|---|---|---|---|---|---|---|
| 000 | 48.17 | 45.52 | 1.0813 | 1.0813 | 0.00 | 0.00 |
| 200 | 46.87 | 44.37 | 1.0760 | 1.0760 | 0.59 | 0.59 |
| 400 | 45.57 | 43.20 | 1.0708 | 1.0709 | 1.19 | 1.18 |
| 600 | 44.28 | 42.04 | 1.0658 | 1.0660 | 1.78 | 1.76 |
| 800 | 42.94 | 40.87 | 1.0611 | 1.0612 | 2.36 | 2.33 |
| 1000 | 41.68 | 39.69 | 1.0565 | 1.0566 | 2.94 | 2.90 |
| 1200 | 40.38 | 38.51 | 1.0520 | 1.0522 | 3.52 | 3.47 |
| 1400 | 39.08 | 37.32 | 1.0478 | 1.0480 | 4.10 | 4.02 |
| 1600 | 37.79 | 36.13 | 1.0437 | 1.0439 | 4.66 | 4.58 |
| 1800 | 36.49 | 34.94 | 1.0398 | 1.0400 | 5.23 | 5.12 |
| 2000 | 35.19 | 33.74 | 1.0361 | 1.0362 | 5.78 | 5.67 |

TABLE 1-continued

| TRACK N | ACTUATOR ANGLE ERROR | RADIUS mm | CORRECTION ACTUAL | CORRECTION APPROX | PHASE ERROR ACTUAL (deg) | PHASE ERROR APPROX (deg) |
|---|---|---|---|---|---|---|
| 2200 | 33.89 | 32.53 | 1.0325 | 1.0326 | 6.33 | 6.20 |
| 2400 | 32.59 | 31.32 | 1.0291 | 1.0292 | 6.88 | 6.73 |
| 2600 | 31.30 | 30.11 | 1.0259 | 1.0260 | 7.41 | 7.26 |
| 2800 | 30.00 | 28.89 | 1.0228 | 1.0229 | 7.93 | 7.78 |
| 3000 | 28.70 | 27.67 | 1.0199 | 1.0200 | 8.45 | 8.29 |
| 3200 | 27.40 | 26.45 | 1.0172 | 1.0172 | 8.95 | 8.80 |
| 3400 | 26.10 | 25.22 | 1.0146 | 1.0146 | 9.44 | 9.30 |
| 3600 | 24.81 | 23.99 | 1.0122 | 1.0122 | 9.90 | 9.80 |
| 3800 | 23.51 | 22.76 | 1.0100 | 1.0100 | 10.36 | 10.29 |
| 4000 | 22.21 | 21.53 | 1.0079 | 1.0079 | 10.78 | 10.78 |
| 4134 | 21.34 | 20.70 | 1.0066 | 1.0066 | 11.05 | 11.10 |

Figure 6:
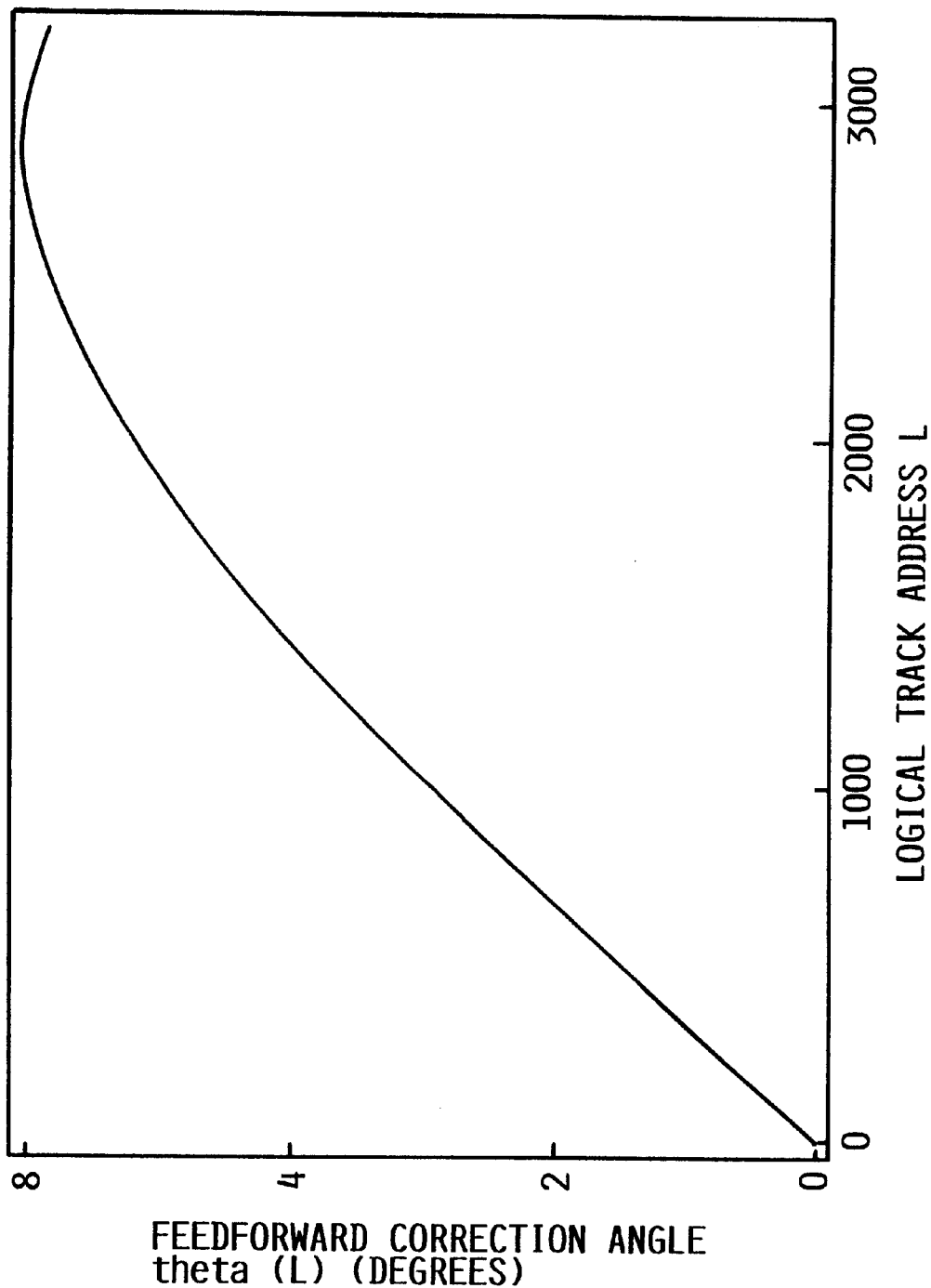
FIG. 6 is a chart illustrating feedforward correction angles relative to logical track addresses for a 3.5" disk drive.

FIG. 6 is a chart illustrating feedforward correction angles relative to logical track addresses, taking for an example a 3.5" drive with $R_a$=52 mm, $R_b$=57 mm, $R_o$=45.52 mm, $R_i$=20.68 mm, and at a track density of 3300 tpi. FIG. 6 shows the required magnitude of the required correction angle θ(L) as a function of the logical track address L. It can be seen that the maximum error occurs at L~2900. Note that the phase error is non-linear; and therefore, it is more complicated to provide phase compensation correction.

Figure 7:
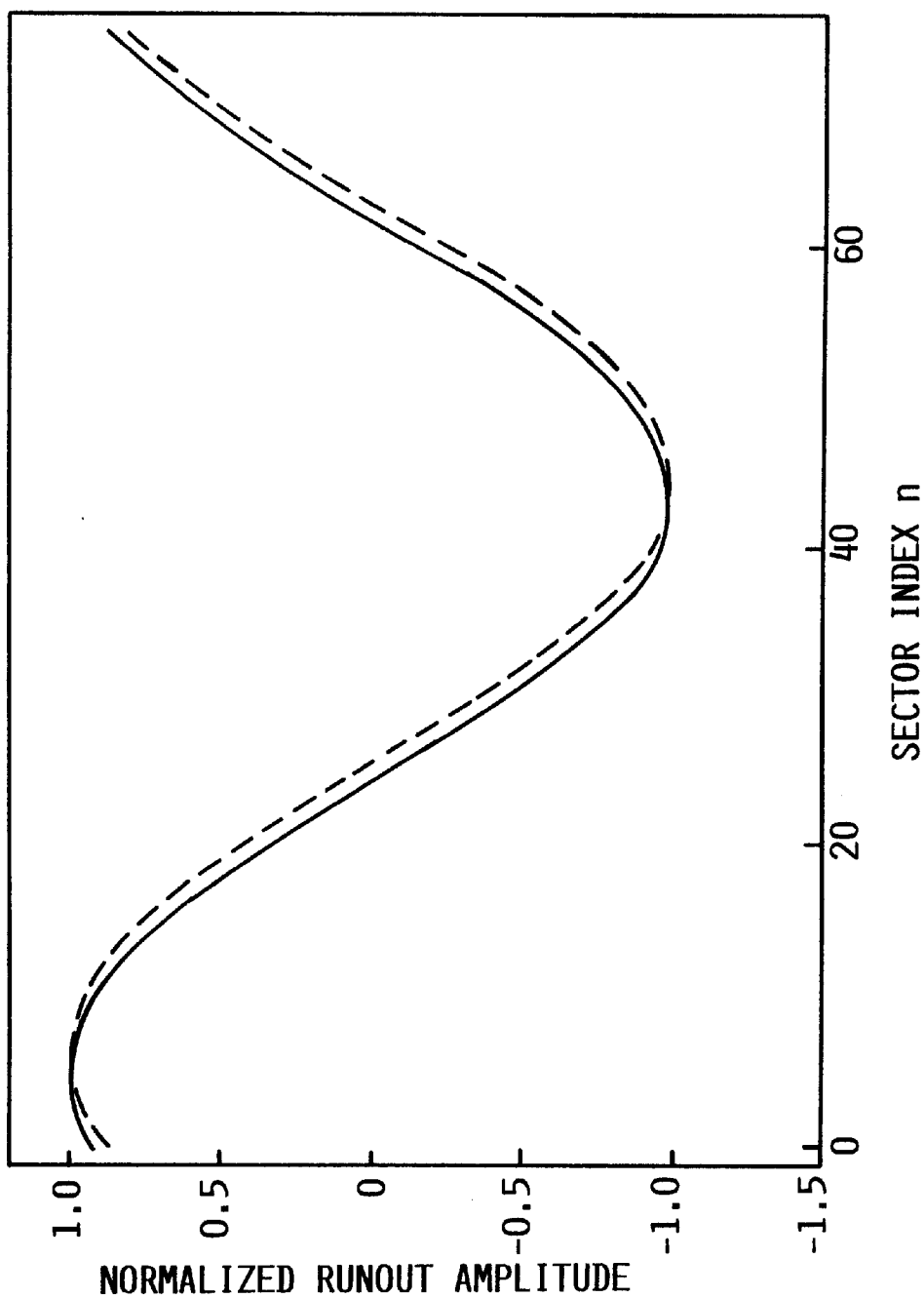
FIG. 7 is a chart illustrating normalized runout amplitude relative to sector index n at the inside diameter (ID) shown in solid line and at the outside diameter (OD) shown in dotted line for a 3.5" disk drive.

FIG. 7 is a chart illustrating normalized runout amplitude relative to sector index n at the inside diameter (ID) and at the outside diameter (OD) shown in dotted line. Seventy-six servo sectors are assumed for this example and in FIG. 8. In terms of the first harmonic runout measured for the servo sectors at the outer track radius $R_o$ and the inner track radius $R_i$, there is a leading phase shift of 5.9° as measured at the inner track radius. This phase shift is clearly evident in FIG. 7, which shows normalized runout amplitudes at the extreme tracks. The difference between the runout amplitudes in FIG. 7 is shown in FIG. 8.

Figure 8:
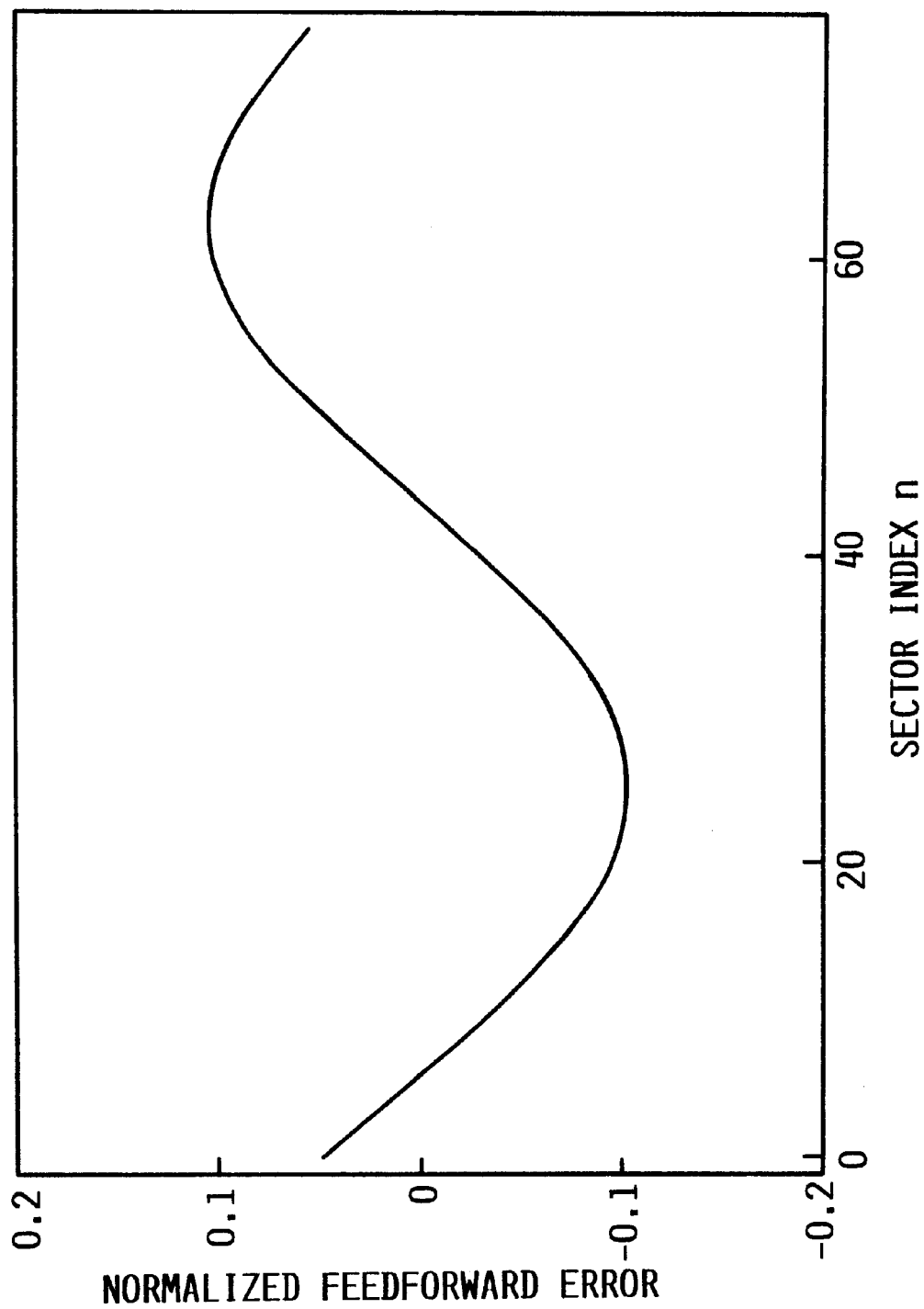
FIG. 8 is a chart illustrating normalized runout error due to phase shift between the inside diameter (ID) and the outside diameter (OD) relative to sector index n for a 3.5" disk drive.

FIG. 8 is a chart illustrating normalized runout error due to phase shift between the inside diameter (ID) and the outside diameter (OD) relative to sector index n. This is the normalized feedforward error between inner and outer tracks. It can be seen from FIG. 8 that this error is about 10% of the runout amplitude in FIG. 7.

In addition, much better actuator servo control and improved TMR is provided by interpolating between a sparse number of servo sectors to yield many more feedforward outputs. Typically there are 60–90 servo sectors per track. For a given linear density and data blocking format, the number of servo sectors per track decreases linearly with decreasing form factors (FF). This can be seen from Table 2 below.

TABLE 2

Servo Sector Number for Small FF Disk Drives at Fixed Linear Density

| FORM FACTOR | SERVO SECTORS N |
|---|---|
| 3.5" | 76 |
| 2.5" | 54 |
| 1.8" | 39 |
| 1.3" | 28 |
| 1.0" | 21 |

While usually a smaller 1.0" drive spins much faster than a 3.5" drive to keep the recording heads flying, 21 sectors per track provides inadequate spacial resolution to maintain good tracking at high track densities. Thus, the following method provides more spatial resolution without increasing the servo sector overhead on the disk surface.

First consider where $w_o$, the discrete frequency for N servo sectors is expressed as $$w_o = \frac{2\pi}{N} \quad (17)$$

The cos $w_o n$ and sin $w_o n$, used in the above Equations 12, 13, and 14 are generated by a simple code in the feedforward controller 70. Note that Equations 10 and 11 are only updated during periodic measurements that may be a function of the ambient conditions, while Equation 12 is being used continuously.

Assume now that we modify Equation 12 by changing the discrete frequency $w_o$ to a lower discrete frequency $w_1$. Let this frequency be $$w_1 = \frac{2\pi}{M}, \quad M > N \quad (18)$$

where M is the number of virtual or pseudo sectors (M>N). Let m be the pseudo sector index such that 0<m<M−1 so that Equation 12 can be modified to yield the estimated fundamental feedforward compensation.

$$x_1(m, L) = \frac{2}{N} [C(1, L)\cos w_1 m - D(1, L)\sin w_1 m], \quad (19)$$

$$0 \le m \le M - 1$$

If M=P×N where P is an integer, then there will be (P−1) pseudo correction samples generated by Equation 19 between each of the N physical servo sectors.

Figure 9:
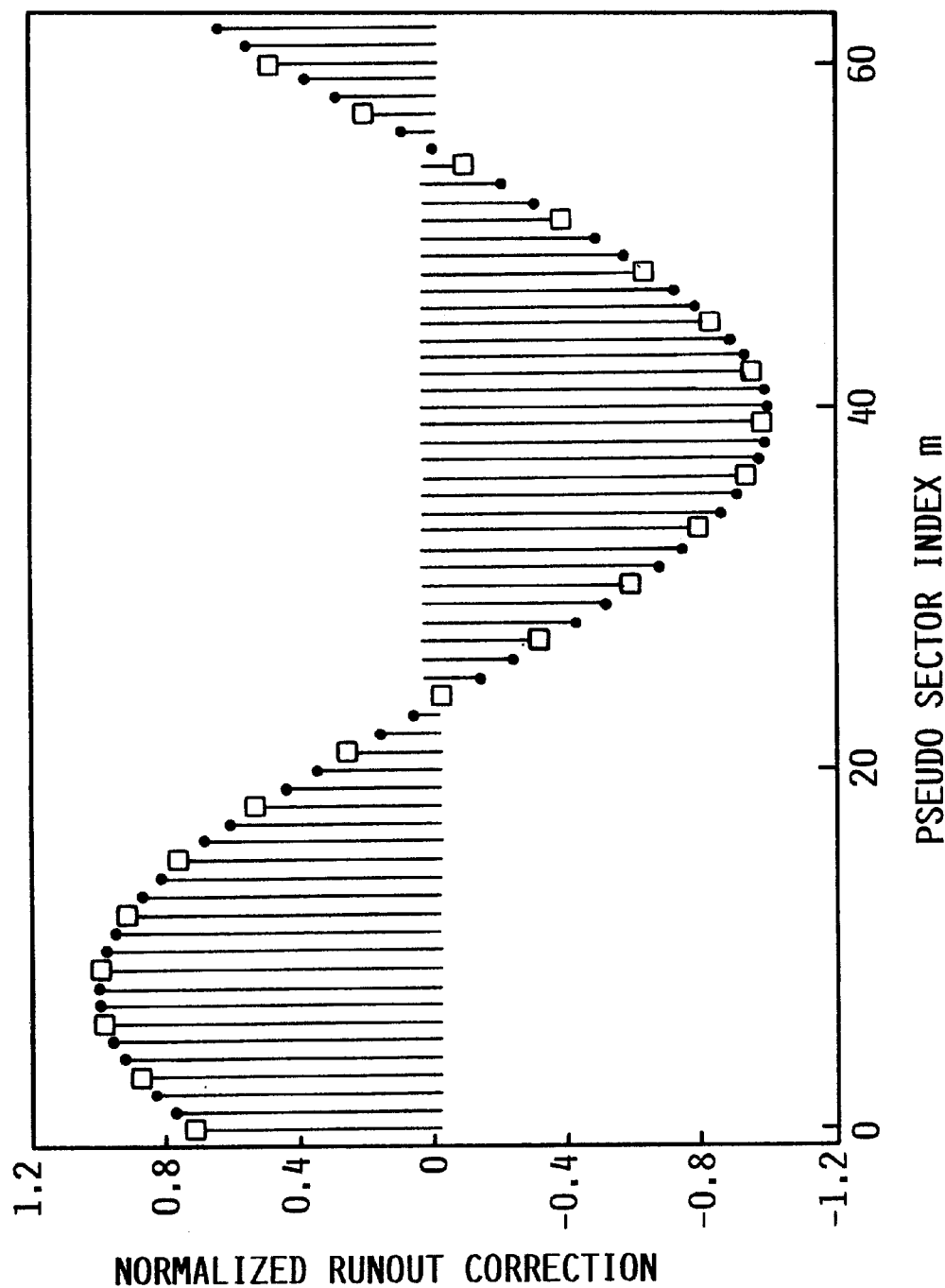
FIG. 9 is a chart illustrating simulated runout correction relative to pseudo sector index m.

Referring to FIG. 9, there is shown an arbitrary normalized runout correction for a hypothetical 1.0" form factor disk drive with N=21 sectors indicated by squares and M=63 pseudo sectors (P=3) indicated by asterisks. If the 1.0" file only compensated for repeatable runout for every physical servo sector (see squares) then the correction signal which is generated by a zero-order-hold (ZOH) or digital-to-analog converter (DAC) 62 would be rather coarse around the zero crossings of the sine wave. The pseudo sector compensation (see asterisks) provides much better resolution. The increased resolution provides a smoother control signal for PA 24 and thus reduces the excitation of actuator and suspension resonances. This would be the case for seek, settle, and track follow operational modes.

The number of pseudo sectors M is arbitrary and can be considered to be variable. For example, during data recovery procedures (DRP) the number of pseudo sectors M can be increased to provide better tracking. The phase corrected feedforward compensation as given by Equation 19 advantageously can be implemented in a separate module for complete freedom in the selection of M. This will minimize the impact on the regular actuator servo code.

It should be understood that this method can be used to reduce the number of physical servo sectors on larger form factor drives to yield more disk real estate for customer data. This would be the case for drives that have larger repeatable TMR components compared to non-repeatable TMR.

Secondary Actuator At Slider Level

Although SA 26 is shown in FIGS. 1 and 2 at the suspension level, the SA may alternatively be provided at the slider level. At the slider level, a micromechanical actuator attached at the interface between the suspension and the slider moves the slider relative to the suspension, or a micromechanical actuator attached at the interface between the slider and the head moves the head relative to the slider. Providing the SA at the slider level is advantageous because it further reduces the mass that must be moved by the SA and increases the bandwidth of the SA. In either case, a slider level SA would simply replace SA 26 in the apparatus of FIG. 3. Likewise, the calibration, seek, settle, and track follow modes would operate in the same manner using a slider level SA as described above with respect to SA 26.

Figure 10:
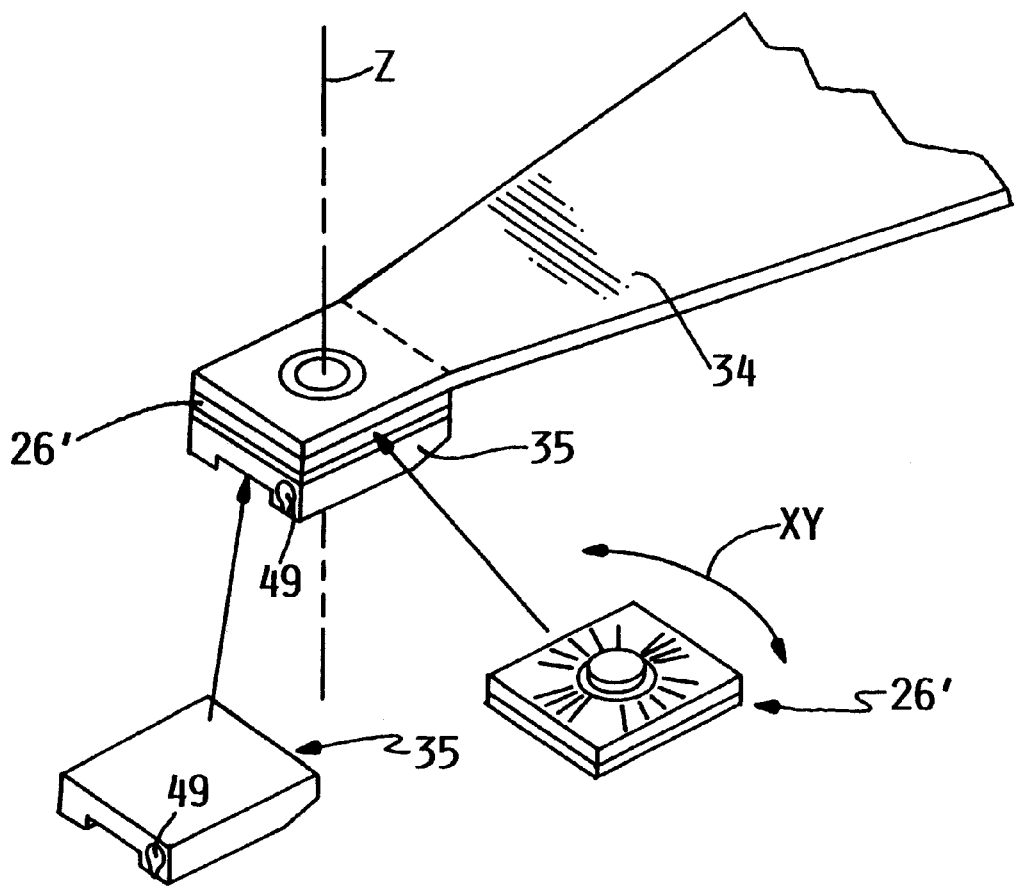
FIG. 10 is an exploded perspective view of a rotary actuator attached at the interface between a load beam and a slider, which bi-directionally pivots the slider relative to the load beam about an axis through the slider. The rotary actuator shown in FIG. 10 may be used as a secondary actuator (SA) or a tertiary actuator (TA).

FIG. 10 shows a rotary SA 26' attached at the interface between load beam 34 and slider 35 which bi-directionally pivots slider 35 relative to load beam 34 about an axis Z through slider 35. SA 26', like SA 26, is a position actuator and is preferably a conventional rotary microactuator in which spring flexures (not shown) bias the microactuator toward a neutral position and in which interdigitated electrodes (not shown) are electrostatically activated to produce rotary motion. Such microactuators are disclosed in, for example, L.-S. Fan, "Batch-Fabricated Area-Efficient Milli-Actuators", Proceedings of IEEE Solid State Sensor and Actuator Workshop, Hilton Head, S.C., Jun. 13–16, 1994, pp. 38–42; and L.-S. Fan et al., "Shock-Resistant Rotary Microactuator for Fine Positioning of Recording Heads", IBM Technical Disclosure Bulletin, Vol. 37, No. 8, August 1994, pp. 401–403. Preferably, SA 26' provides a range of motion for a head 49 mounted on slider 35 of ±2 or 3 tracks. Although preferably rotary, SA 26' may instead be linear. SA 26' need not be driven by electrostatic activation elements, and may alternatively be driven by piezoelectric or electromagnetic activation elements.

Figure 11:
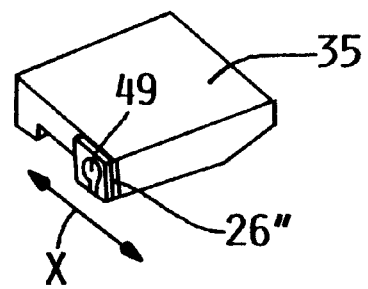
FIG. 11 is a perspective view of a linear actuator attached at the interface between a slider and a head, which bi-directionally moves the head relative to the slider. The linear actuator shown in FIG. 11 may be used as a secondary actuator (SA) or a tertiary actuator (TA).

FIG. 11 shows a linear SA 26" attached at the interface between slider 35 and head 49 which bi-directionally moves head 49 relative to slider 35 in direction X. SA 26", like SA 26, is a position actuator and is preferably a conventional linear microactuator in which spring flexures (not shown) bias the microactuator toward a neutral position and in which interdigitated electrodes (not shown) are electrostatically activated to produce linear motion. Such microactuators are disclosed in, for example, L.-S. Fan, "Batch-Fabricated Area-Efficient Milli-Actuators", Proceedings of IEEE Solid State Sensor and Actuator Workshop, Hilton Head, S.C., Jun. 13–16, 1994, pp. 38–42; and L.-S. Fan et al., L.-S. Fan, "Batch-Fabricated Milli-Actuators", Proceedings of IEEE ASME Micro Electro Mechanical Systems, February 1993, pp. 179–183. Preferably, SA 26" provides a range of motion for a head 49 mounted on slider 35 of ±2 or 3 tracks. Although preferably linear, SA 26" may instead be linear. SA 26" need not be driven by electrostatic activation elements, and may alternatively be driven by piezoelectric or electromagnetic activation elements.

Actuators With Three or More Stages

Figure 12:
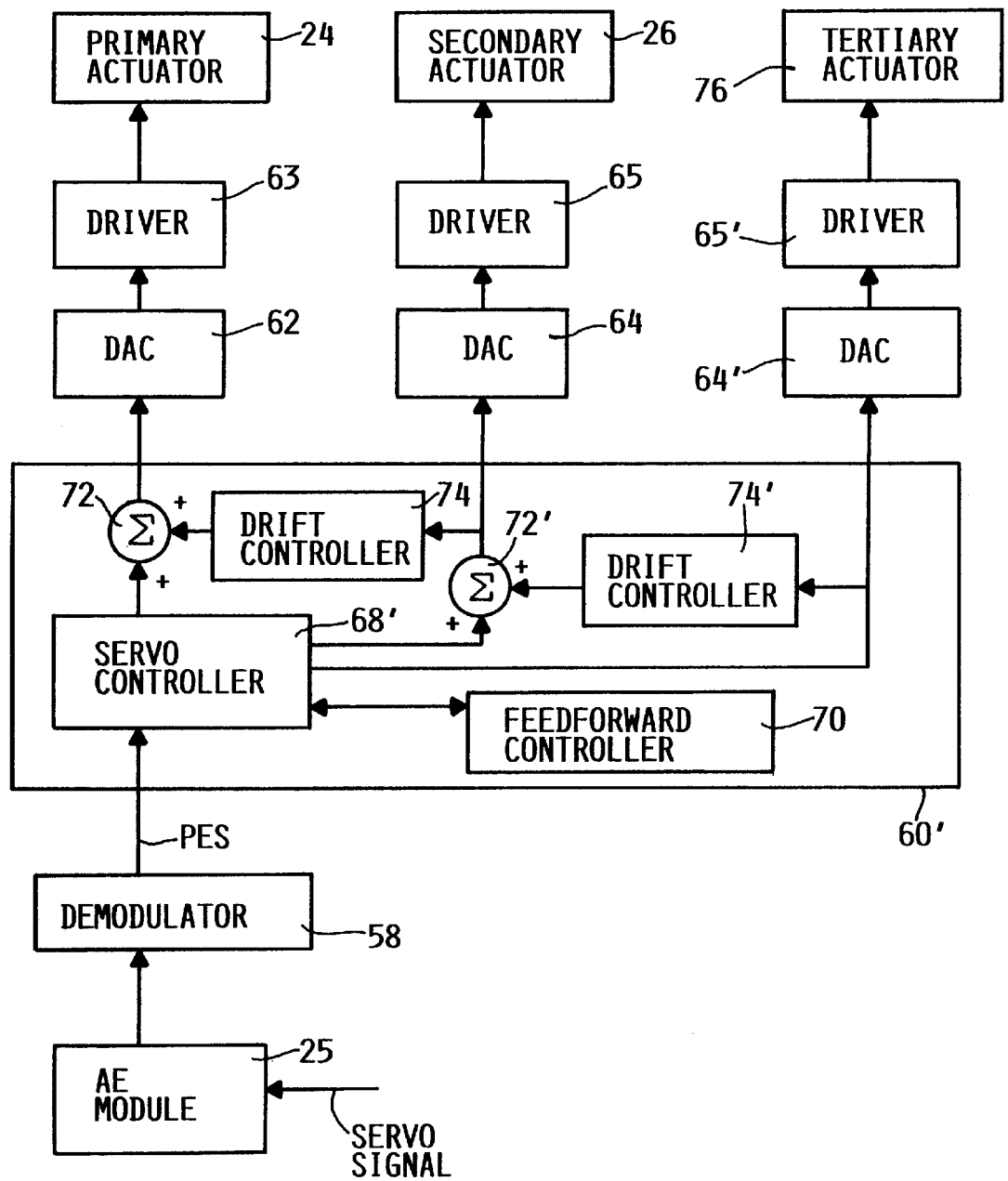
FIG. 12 is a block diagram of an apparatus for controlling a three-stage actuator.

The present invention is also applicable to multiple-stage actuators having more than two actuator stages. For example, FIG. 12 is a block diagram of an apparatus for controlling a three-stage actuator. In FIG. 12, the same reference numerals are used to denote elements identical to those shown in FIG. 3, while primed reference numerals are used to denote elements similar to those shown in FIG. 3. In addition to PA 24 and SA 26, a tertiary actuator (TA) 76 is also controlled by servo processor 60'. The TA 76 is a position actuator riding piggyback on SA 26, and is preferably a slider level actuator, such as actuator 26' or 26", so as to further increase the bandwidth.

Servo controller 68' is identical to servo controller 68 shown in FIG. 3, except that servo controller 68' additionally generates a drive signal for TA 76. This drive signal from servo controller 68' is fed into a digital-to-analog converter (DAC) 64' where it is converted and held to an equivalent analog value that is smoothed and converted to a current by a driver 65'. This current is supplied to the activation elements of TA 76 through the flexible cable and lead wires. During the calibration and seek modes, the drive signal causes TA 76 to be clamped against a mechanical stop. During the settle mode and the track follow mode, the drive signal causes TA 76 to move in the direction to reduce the PES beyond the reduction provided by SA 26. Because the movement of the activation elements of TA 76 is caused by potential and current, driver 65' need not convert the output of DAC 64' to a current, but may instead convert this output to a voltage or a combination of current and voltage.

Drift controller 74' calculates a moving average of the drive signal for TA 76. Summer 72' modifies the drive signal for SA 26 by adding thereto the moving average of the drive signal for TA 76.

While the invention has been described with reference to details of the illustrated embodiments, these details are not intended to limit the scope of the invention as defined in the appended claims.

We claim:

1. An apparatus for controlling a multiple-stage actuator for a disk drive, the multiple-stage actuator including a secondary actuator riding piggyback on a primary actuator, wherein said secondary actuator has a neutral position relative to said primary actuator when a drive signal is not applied to said secondary actuator, wherein the multiple-stage actuator includes a tertiary actuator riding piggyback on the secondary actuator, wherein said tertiary actuator has a neutral position relative to said secondary actuator when a drive signal is not applied to said tertiary actuator, comprising:

means for generating said drive signal for said secondary actuator;

means for calculating a moving average of said drive signal for said secondary actuator;

means for generating a feedforward compensation signal;

means for generating a modified feedforward compensation signal for the primary actuator by modifying said feedforward compensation signal based on said moving average of said drive signal for said secondary actuator;

means for generating said drive signal for the tertiary actuator;

means for calculating a moving average of said drive signal for the tertiary actuator; and means for modifying said drive signal for the secondary actuator based on said moving average of said drive signal for the tertiary actuator.

2. A method for controlling a multiple-stage actuator for a disk drive, said multiple-stage actuator including a secondary actuator riding piggyback on a primary actuator, wherein said secondary actuator has a neutral position relative to said primary actuator when a drive signal is not applied to said secondary actuator, wherein the multiple-stage actuator includes a tertiary actuator riding piggyback on the secondary actuator, wherein said tertiary actuator has a neutral position relative to said secondary actuator when a drive signal is not applied to said tertiary actuator, comprising the steps of:

generating said drive signal for said secondary actuator;

calculating a moving average of said drive signal for said secondary actuator;

generating a feedforward compensation signal;

generating a modified feedforward compensation signal for the primary actuator by modifying said feedforward compensation signal based on said moving average of said drive signal for said secondary actuator;

generating said drive signal for the tertiary actuator;

calculating a moving average of said drive signal for the tertiary actuator; and modifying said drive signal for the secondary actuator based on said moving average of said drive signal for the tertiary actuator.

3. A multiple-stage actuator for a disk drive, comprising:

a primary actuator;

a secondary actuator riding piggyback on said primary actuator, wherein said secondary actuator has a neutral position relative to said primary actuator when a drive signal is not applied to said secondary actuator; and control means for controlling said primary actuator and said secondary actuator, said control means including means for generating said drive signal for said secondary actuator, means for calculating a moving average of said drive signal, means for generating a feedforward compensation signal, and means for generating a modified feedforward compensation signal for said primary actuator by modifying said feedforward compensation signal based on said moving average of said drive signal, wherein said secondary actuator includes an arm attached to said primary actuator for movement by said primary actuator, a load beam extending from said arm, a slider mounted on a distal end of said load beam, a head mounted on said slider, and a micromechanical transducer element secured between said head and said slider, and operatively connected to said means for generating said drive signal such that said head is moved relative to said slider by said micromechanical transducer element based on said drive signal.

4. A multiple-stage actuator for a disk drive, comprising:

a primary actuator;

a secondary actuator riding piggyback on said primary actuator, wherein said secondary actuator has a neutral position relative to said primary actuator when a drive signal is not applied to said secondary actuator; and control means for controlling said primary actuator and said secondary actuator, said control means including means for generating said drive signal for said secondary actuator, means for calculating a moving average of said drive signal, means for generating a feedforward compensation signal, and means for generating a modified feedforward compensation signal for said primary actuator by modifying said feedforward compensation signal based on said moving average of said drive signal, wherein said secondary actuator includes an arm attached to said primary actuator for movement by said primary actuator, a load beam extending from said arm, a slider mounted on a distal end of said load beam, and a micromechanical transducer element secured between said slider and distal end of said load beam, and operatively connected to said means for generating said drive signal such that said slider is moved relative to said distal end of said load beam by said micromechanical transducer element based on said drive signal.

5. The multiple-stage actuator as recited in claim 4, wherein the movement of said slider relative to said distal end of said load beam caused by said micromechanical transducer element is pivotable about an axis through said slider.

* * * * *